(12) United States Patent
Jun

(10) Patent No.: US 11,372,493 B2
(45) Date of Patent: Jun. 28, 2022

(54) TOUCH DRIVER, TOUCH DISPLAY DEVICE, AND METHOD OF DRIVING TOUCH DISPLAY DEVICE

(71) Applicant: LG DISPLAY CO., LTD., Seoul (KR)

(72) Inventor: Jaehun Jun, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/113,601

(22) Filed: Dec. 7, 2020

(65) Prior Publication Data

US 2021/0191554 A1 Jun. 24, 2021

(30) Foreign Application Priority Data

Dec. 24, 2019 (KR) .................. 10-2019-0174317

(51) Int. Cl.
*G06F 3/041* (2006.01)
*G09G 3/36* (2006.01)
*G06F 3/044* (2006.01)
*G06V 40/60* (2022.01)
*G06V 40/13* (2022.01)
*G06V 40/12* (2022.01)

(52) U.S. Cl.
CPC ............ *G06F 3/0412* (2013.01); *G06F 3/044* (2013.01); *G06F 3/0418* (2013.01); *G06F 3/04164* (2019.05); *G06V 40/1306* (2022.01); *G06V 40/67* (2022.01); *G09G 3/3674* (2013.01); *G06V 40/1359* (2022.01)

(58) Field of Classification Search
None
See application file for complete search history.

(56) References Cited

U.S. PATENT DOCUMENTS

| | | | |
|---|---|---|---|
| 2014/0118297 A1* | 5/2014 | Huang | G06F 3/0236 345/174 |
| 2016/0313850 A1* | 10/2016 | Aubry | G06F 3/0416 |
| 2017/0140201 A1* | 5/2017 | Li | G06K 9/00013 |

* cited by examiner

*Primary Examiner* — Nicholas J Lee
(74) *Attorney, Agent, or Firm* — Birch, Stewart, Kolasch & Birch, LLP

(57) ABSTRACT

Provided is a touch display device that can sense a touch input of a finger with the touch display device, recognize a finger touch position, specify a fingerprint sensing area, and sense a fingerprint in the fingerprint sensing area. Provided is also a touch display device that does not need a particularly fingerprint sensing line by performing fingerprint sensing using data lines of the touch display device and that can sense a fingerprint without decreasing a fingerprint sensing performance by minimizing a parasitic capacitance which can be generated in data lines, gate lines, touch electrodes, or the like at the time of sensing a fingerprint.

20 Claims, 15 Drawing Sheets

TOUCH DRIVER, TOUCH DISPLAY DEVICE, AND METHOD OF DRIVING TOUCH DISPLAY DEVICE

CROSS REFERENCE TO RELATED APPLICATION

This application claims priority to Korean Patent Application No. 10-2019-0174317, filed on Dec. 24, 2019 in the Republic of Korea, the entire contents of which are hereby expressly incorporated by reference for all purposes as if fully set forth herein into the present application.

BACKGROUND

Field of the Present Disclosure

The embodiments of the present invention relate to a touch driver, a touch display device, and a method of driving a touch display device.

Discussion of the Related Art

With advancement in information-oriented society, requirements for various types of display devices that display an image have increased. Recently, various types of display devices such as a liquid crystal display device (LCD), a plasma display panel (PDP), an organic light emitting display device (OLED), a quantum-dot display device, and a micro LED have been widely used.

As such a display device, a touch display device with a touch-based input system that allows a user to intuitively and conveniently input information or a command instead of a normal input system using buttons, a keyboard, a mouse, and the like.

In order to provide a touch-based input system, such a touch display device has to ascertain a user's touch and accurately detect touch coordinates (a touch position).

For this purpose, a capacitance touch system that detects a touch, touch coordinates, and the like on the basis of a change in capacitance between touch electrodes or capacitance between a touch electrode and a pointer such as a finger using a plurality of touch electrodes which are arranged as touch sensors in a touch panel (a touch screen panel) is often employed.

In order to determine whether there has been a touch, the capacitance touch system has to sense a plurality of touch electrodes and apply a touch driving signal to the plurality of touch electrodes.

Recently, it has been variously tried to recognize a pattern of a fingerprint on a touch display device. In general, in order to recognize a fingerprint pattern on a touch display device, a particularly fingerprint sensor is attached to a touch display device and a fingerprint pattern is identified by sensing a fingerprint of a user's finger and comparing the sensed fingerprint with a fingerprint image or the like registered in advance.

When a particular fingerprint sensor is attached to a touch display device for the purpose of recognition of a fingerprint pattern in this way, costs for the fingerprint sensor are added and thus a price of a touch display device can be increased.

On the other hand, in order to decrease costs for manufacturing touch display devices, it has been variously tried to incorporate fingerprint sensor electrodes into a display device. However, there are technical limits in disposing fingerprint sensors and fingerprint sensor lines for the fingerprint sensors in a touch display device due to structural and physical characteristics of the touch display device. Incorporation of additional fingerprint sensors and fingerprint sensor lines into a touch display device can cause a decrease in aperture ratio of a display screen of the touch display device and can have difficulty in actual application thereof.

SUMMARY OF THE PRESENT DISCLOSURE

The present disclosure provides a touch display device that can sense a finger touch and a fingerprint without using a fingerprint sensing electrode or a fingerprint sensing line for sensing a fingerprint, be easily designed, and reduce manufacturing costs. The present disclosure also provides a touch display device that can decrease a parasitic capacitance or noise which can be generated in electrode arranged in the touch display device.

According to embodiments of the present disclosure, there is provided a touch display device including: a display panel that includes a plurality of data lines, a plurality of gate lines, and a plurality of pixel electrodes which are arranged in areas adjacent to points at which the data lines and the gate lines cross each other and that includes a display image update area and a fingerprint sensing area; a gate driver that supplies a first gate driving voltage to the gate lines corresponding to the display image update area out of the plurality of gate lines in a display period of the display panel and supplies a second gate driving voltage to the gate lines corresponding to the fingerprint sensing area out of the plurality of gate lines in a fingerprint sensing period of the display panel; and a touch driver that supplies a data voltage to the data lines corresponding to the display image update area out of the plurality of data lines in the display period of the display panel and supplies a fingerprint driving signal to the data lines corresponding to the fingerprint sensing area out of the plurality of data lines in the fingerprint sensing period of the display panel, wherein the second gate driving voltage supplied to the gate lines corresponding to the fingerprint sensing area in the fingerprint sensing period of the display panel is higher than the first gate driving voltage supplied to the gate lines corresponding to the display image update area in the display period of the display panel, and wherein a time in which the second gate driving voltage is supplied to the gate lines corresponding to the fingerprint sensing area in the fingerprint sensing period of the display panel is longer than a time in which the first gate driving voltage is supplied to the gate lines corresponding to the display image update area in the display period of the display panel.

In the touch display device according to the embodiments of the present disclosure, the second gate driving voltage supplied to the gate lines corresponding to the fingerprint sensing area in the fingerprint sensing period of the display panel can be a voltage having a noise reduction signal added thereto.

In the touch display device the embodiments of the present disclosure, a noise reduction signal can be supplied to the gate lines around the gate lines corresponding to the pixel electrodes which are sensed out of the gate lines corresponding to the fingerprint sensing area in the fingerprint sensing period of the display panel.

In the touch display device the embodiments of the present disclosure, the gate lines around the gate lines corresponding to the pixel electrodes which are sensed out of the gate lines corresponding to the fingerprint sensing area in the fingerprint sensing period of the display panel can be maintained in a floating state.

In the touch display device the embodiments of the present disclosure, a noise reduction signal can be supplied to the data lines which are arranged around the fingerprint sensing area in the fingerprint sensing period of the display panel.

In the touch display device the embodiments of the present disclosure, the data lines which are arranged around the fingerprint sensing area can be updated in display image or maintained in a floating state in the fingerprint sensing period of the display panel.

In the touch display device the embodiments of the present disclosure, the display panel can further include a plurality of touch electrodes and a plurality of touch lines, and a touch driving signal can be supplied to the plurality of touch electrodes via the plurality of touch lines.

In the touch display device the embodiments of the present disclosure, the display panel can sense a touch which occurs in a plurality of touch electrodes, recognize a touch position in a touch electrode sensing period, and specify the fingerprint sensing area on the basis of the recognized touch position.

In the touch display device the embodiments of the present disclosure, the display panel can supply a voltage or a signal which is predetermined for the fingerprint sensing area to the data lines or the gate lines after having specified the fingerprint sensing area.

In the touch display device the embodiments of the present disclosure, the touch driver can include a plurality of touch line multiplexers, a plurality of data line multiplexers, and a plurality of touch sensors, a first down-terminal of at least one data line multiplexer out of the plurality of data line multiplexers can be electrically connected to a data terminal of at least one touch line multiplexer out of the plurality of touch line multiplexers, and the fingerprint driving signal can be supplied to the data lines corresponding to the fingerprint sensing area.

In the touch display device the embodiments of the present disclosure, the touch driver can include a plurality of touch line multiplexers, a plurality of data line multiplexers, and a plurality of touch sensors, and a noise reduction signal can be supplied to a third down-terminal of at least one data line multiplexer out of the plurality of data line multiplexers.

In the touch display device the embodiments of the present disclosure, the touch driver can include a plurality of touch line multiplexers, a plurality of data line multiplexers, a plurality of line selection multiplexers, and a plurality of touch sensors, a first down-terminal of at least one data line multiplexer out of the plurality of data line multiplexers can be electrically connected to at least one line selection multiplexer out of the plurality of line selection multiplexers, and the fingerprint driving signal can be supplied to the data lines corresponding to the fingerprint sensing area.

According to embodiments of the present disclosure, there is provided a method of driving a touch display device including a plurality of data lines, a plurality of gate lines, a plurality of pixel electrodes which are arranged in areas adjacent to points at which the data lines and the gate lines cross each other, a plurality of touch electrodes, and a plurality of touch lines, the method including: a step of sensing a finger touch which occurs in the touch display device; a step of recognizing a position at which the finger touch has occurred; a step of specifying a fingerprint sensing area on the basis of the position at which the finger touch has occurred; a step of preparing for sensing of a fingerprint in the fingerprint sensing area; and a step of sensing at least a part of the fingerprint sensing area and recognizing a fingerprint of the sensed part.

In the method of driving the touch display device the embodiments of the present disclosure, the step of specifying the fingerprint sensing area can include specifying the fingerprint sensing area on the basis of a density of the touch electrodes in which a sensed touch raw value is equal to or greater than a predetermined reference value out of the plurality of touch electrodes.

In the method of driving the touch display device the embodiments of the present disclosure, the step of specifying the fingerprint sensing area can include specifying the fingerprint sensing area on the basis of the number of touch electrodes or a degree of closeness or a degree of separation of the touch electrodes associated with the position at which the touch has occurred.

In the method of driving the touch display the embodiments of the present disclosure, the step of preparing for sensing of a fingerprint can include displaying a predetermined pattern (a black, white, or specific pattern image) or a predetermined image in the specified fingerprint sensing area or supplying a predetermined voltage or signal to the data lines corresponding to the specified fingerprint sensing area, the gate lines corresponding to the specified fingerprint sensing area, or the touch electrodes corresponding to the specific fingerprint sensing area.

In the method of driving the touch display device according to the embodiments of the present disclosure, the step of sensing at least a part of the fingerprint sensing area can include supplying a second gate driving voltage to the gate lines corresponding to the fingerprint sensing area.

In the method of driving the touch display device according to the embodiments of the present disclosure, the second gate driving voltage which is supplied to the gate lines corresponding to the fingerprint sensing area in the step of sensing at least a part of the fingerprint sensing area can be higher than a first gate driving voltage which is supplied to the gate lines corresponding to the display image update area in a display period of the display panel, or a time in which the second gate driving voltage is supplied to the gate lines corresponding to the fingerprint sensing area in the step of sensing at least a part of the fingerprint sensing area can be longer than a time in which a first gate driving voltage is supplied to the gate lines corresponding to the display image update area in the display period of the display panel.

According to embodiments of the present disclosure, there is provided a touch driver that drives a touch display device including a plurality of data lines, a plurality of gate lines, a plurality of pixel electrodes which are arranged in areas adjacent to points at which the data lines and the gate lines cross each other, and a plurality of touch lines, the touch driver including: a plurality of touch line multiplexers that transmit a touch driving signal to the plurality of touch lines via a plurality of touch line channel portions; a plurality of data line multiplexers that transmit a data voltage to the corresponding data lines out of the plurality of data lines via the data line channel portions; and a plurality of touch sensors that are electrically connected to the corresponding data line multiplexers out of the plurality of data line multiplexers, wherein a first down-terminal of at least one data line multiplexer out of the plurality of data line multiplexers is electrically connected to a data terminal of at least one touch line multiplexer out of the plurality of touch line multiplexers and a fingerprint driving signal is supplied to the data lines corresponding to a fingerprint sensing area of the touch display device.

The touch driver according to the embodiments of the present disclosure can further include a plurality of touch line multiplexers, a first down-terminal of at least one data line multiplexer out of the plurality of data line multiplexers can be electrically connected to at least one line selection multiplexer out of the plurality of line selection multiplexers, and the fingerprint driving signal can be supplied to the data lines corresponding to the fingerprint sensing area of the touch display device.

According to the embodiments of the present disclosure, it is possible to provide a touch display device that can sense a finger touch and a fingerprint without using a particularly fingerprint sensing electrode or any particular fingerprint sensing line, be easily designed, and reduce manufacturing costs.

According to the embodiments of the present disclosure, it is possible to provide a touch display device that can sense a finger touch position, accurately recognize the finger touch position, and specify a fingerprint sensing area when a finger touch occurs in the touch display device.

According to the embodiments of the present disclosure, it is possible to provide a touch display device that can decrease a parasitic capacitance or noise which can be generated therein by applying a noise reduction signal to the electrodes arranged in the touch display device at the time of sensing a fingerprint.

According to the embodiments of the present disclosure, since only a necessary area can be accurately sensed by setting a fingerprint sensing area of the touch display device to the same size or the same shape as a finger touch area, it is possible to provide a touch display device that can save a time required for sensing a fingerprint.

According to the embodiments of the present disclosure, it is possible to provide a touch display device that can improve accuracy of fingerprint sensing by setting a fingerprint sensing area to be larger than an estimated finger touch area when the size and shape of the finger touch area of the touch display device is difficult to estimate.

According to the embodiments of the present disclosure, it is possible to provide a touch display device that can decrease a turn-on resistance of a drive transistor and enhance accuracy of fingerprint sensing by applying a gate voltage which is higher than a gate voltage for display driving to the gate lines corresponding to a fingerprint sensing area in the fingerprint sensing period.

According to the embodiments of the present disclosure, it is possible to provide a touch display device that can enhance accuracy of fingerprint sensing and satisfactorily secure a fingerprint sensing time by setting the time in which a gate voltage is applied to the gate lines corresponding to a fingerprint sensing area to be longer than the time in which a gate voltage is applied to the gate lines corresponding to the display image update area for display driving in the fingerprint sensing period.

DETAILED DESCRIPTION OF THE EMBODIMENTS

Figure 1:
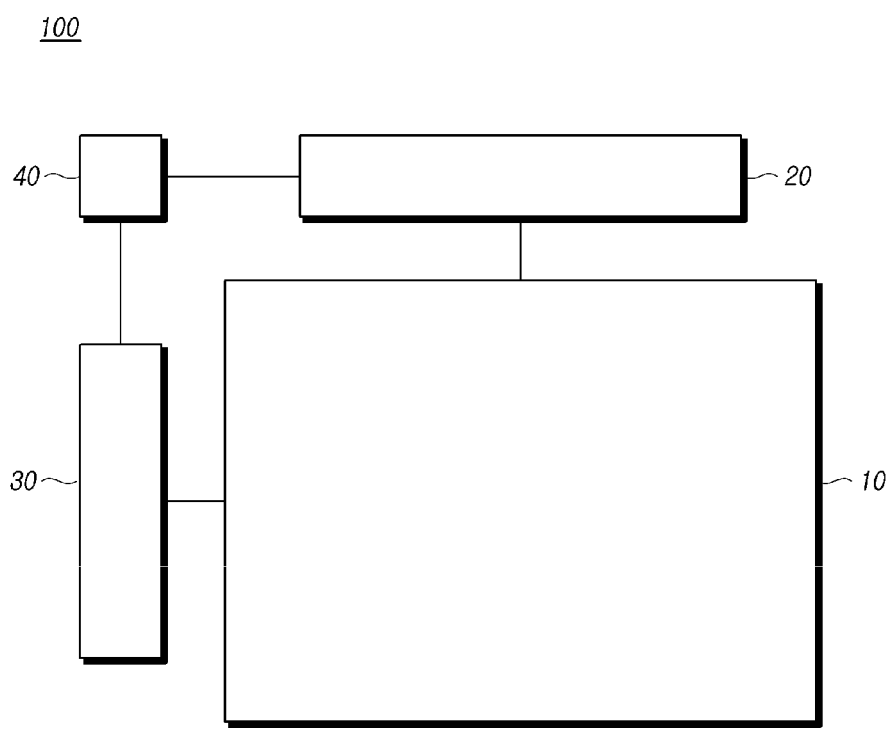
FIG. 1 is a diagram schematically illustrating a general display device.

FIG. 1 is a diagram schematically illustrating a general display device 100. The general display device 100 includes a display panel 10, a data driving circuit 20, a gate driving circuit 30, and a timing control circuit 40. Further, the general display device 100 includes a plurality of data lines, a plurality of gate lines, and a plurality of pixels.

In the general display device 100, for the purpose of providing an image display function, the plurality of data lines and the plurality of gate lines are arranged in the display panel 10, and the plurality of pixels which are defined by the plurality of data lines and the plurality of gate lines are arranged in the display panel 10. The plurality of data lines are controlled by the data driving circuit 20, the plurality of gate lines are controlled by the gate driving circuit 30, and the data driving circuit 20 and the gate driving circuit 30 are controlled by the timing control circuit 40.

The plurality of pixels are arranged in the display panel 10 of the general display device 100, and the plurality of pixels are supplied with pixel voltages from the plurality of data lines and form an electric field along with a common electrode which is a counter electrode to display an image.

Hereinafter, some embodiments of the present disclosure will be described with reference to the accompanying exemplary drawings. In referring to elements in the drawings with reference signs, the same elements will be referred to by the same reference signs. When it is determined that detailed description of the relevant known functions or configurations involved in the invention makes the gist of the invention obscure, the detailed description thereof will be omitted or may be briefly provided.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "linked," "coupled," or "connected" to another element, it should be understood that the element can be directly coupled or connected to another element or still another element can be "interposed" therebetween or the elements can be "linked," "coupled," or "connected" to each other with still another element interposed therebetween. When an element is located "on" or "under" another element, the elements can be located in direct contact with each other, but it should be understood that the elements can be located without direct contact with each other.

Shapes, sizes, ratios, angles, number of pieces, and the like illustrated in the drawings, which are provided for the purpose of explaining the embodiments of the invention, are exemplary and thus the invention is not limited to the illustrated details. In the following description, like elements are referenced by like reference numerals. When it is determined that detailed description of the relevant known functions or configurations involved in the invention makes the gist of the invention obscure, the detailed description thereof will not be made. When "include," "have," "be constituted," and the like are mentioned in the specification, another element can be added unless "only" is used. A singular expression of an element includes two or more elements unless differently mentioned. In construing elements in embodiments of the invention, an error range is included even when explicit description is not made.

Advantages and features of the present disclosure and methods for achieving the advantages or features will be apparent from embodiments described below in detail with reference to the accompanying drawings. However, the invention is not limited to the embodiments but can be modified in various forms. The embodiments are provided merely for completing the disclosure of the invention and are provided for completely informing those skilled in the art of the scope of the invention. The scope of the invention is defined by only the appended claims.

A touch display device according to examples of the present disclosure can be realized as a various types of display devices. For example, the touch display device according to embodiments of the present disclosure can be realized as various types of display devices such as a "liquid crystal display device," an "organic light emitting display device," a "plasma display panel," a "quantum dot display device," and a "micro LED." In the following description, embodiments which are applicable to a "liquid crystal display device" will be mainly described. All the components of the touch display device according to all embodiments of the present disclosure are operatively coupled and configured.

Figure 2:
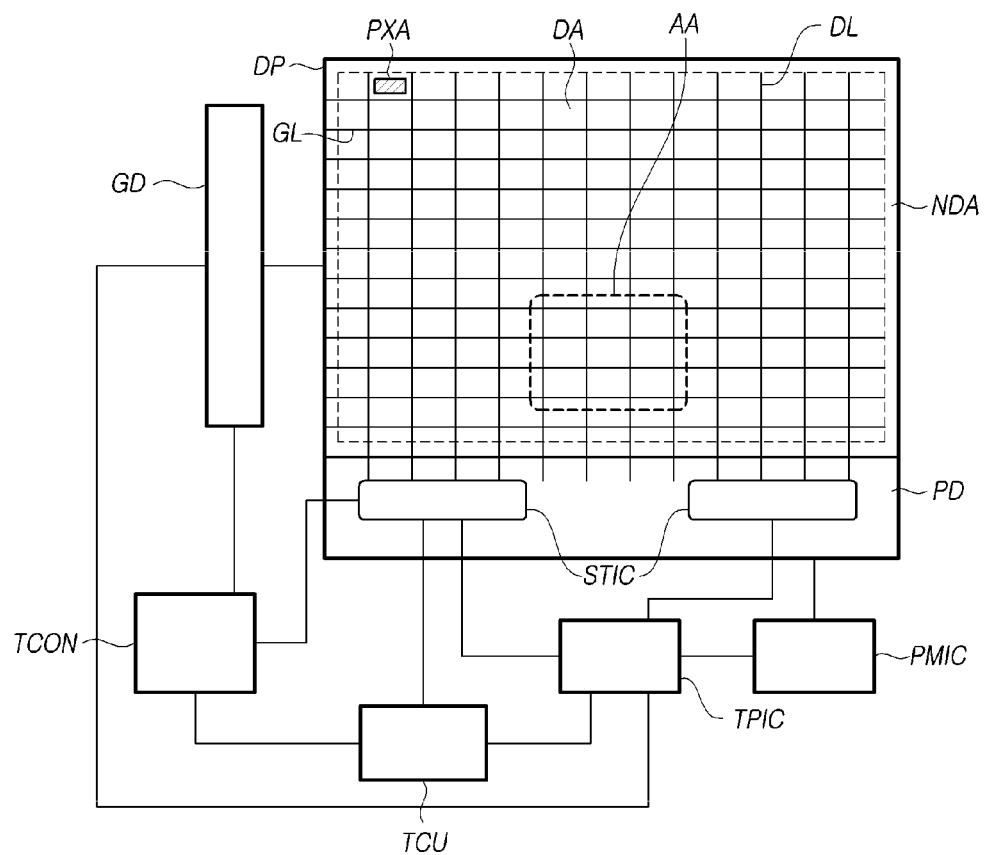
FIG. 2 is a diagram schematically illustrating a touch display device according to embodiments of the present disclosure.

Referring to FIG. 2, a touch display device 200 according to the embodiments of the present disclosure includes a display panel DP, a gate driver GD, a touch driver STIC, a timing controller TCON, a touch controller TCU, a touch power unit TPIC, and a panel power unit PMIC.

The display panel DP of the touch display device 200 according to the embodiments of the present disclosure includes an active area DA in which an image is displayed and a non-display area NDA in which an image is not displayed. The display panel DP includes a plurality of data lines DL, a plurality of gate lines GL, and pixel areas PXA that are defined by the data lines DL and the gate lines GL or are disposed adjacent to each other between the data lines DL and the gate lines GL.

In the touch driver STIC of the touch display device 200 according to embodiments of the present disclosure, a circuit unit for driving touch electrodes and touch lines arranged in the display panel DP and sensing a touch is incorporated therein. In the touch driver STIC, a data driving circuit unit that controls the data lines for displaying an image on the display panel DP can also be incorporated. The data driving circuit unit that controls the data lines DL for displaying an image on the display panel can be configured as a particular IC separate from the touch driver STIC. Here, the touch driver STIC can be disposed in a driving area PD of the display panel DP as illustrated in FIG. 2. For example, the touch driver can be formed in a chip-on-glass (COG) type and be disposed in the driving area PD of the display panel DP. In the touch display device 200 according to embodiments of the present disclosure, the touch driver STIC can be formed in a chip-on-film (COF) type and be disposed close to an edge of the driving are PD of the display panel DP.

The gate driver GD of the touch display device 200 according to embodiments of the present disclosure is electrically connected to the gate lines GL which are arranged in the display panel DP. The gate driver GD controls ON and OFF of driving transistors (thin-film transistors, TFT) that control the gate lines GL such that the data lines DL for displaying an image of the display panel DP supply a data voltage to pixel electrodes which are arranged in the pixels areas PXA. The gate driver GD can be embodied in a gate-in-panel (GIP) type in which it is disposed inside of the display panel DP or can be configured as a particular film type circuit unit (for example, in a chip-on-glass (COG) type or a chip-on-film (COF) type) and connected to the display panel DP.

The panel power unit PIMIC of the touch display device 200 according to embodiments of the present disclosure generates power sources or voltages required for driving the display panel DP and supplies the generated power sources or voltages to the display panel DP. The panel power unit PMIC is electrically connected to the touch power unit TPIC to generate and supply power sources required for the touch power unit TPIC.

The touch power unit TPIC of the touch display device 200 according to embodiments of the present disclosure generates power sources or voltages required for the touch driver STIC and supplies the generated power sources or voltages to the touch driver STIC. The touch power unit TPIC generates power sources or voltages required for touch driving and touch sensing and transmit the generated power sources or voltages to the touch driver STIC, the gate driver GD, or the display panel DP. The touch power unit TPIC generates a fingerprint driving signal and power sources or voltages required for fingerprint sensing and transmit the generate fingerprint driving signal and the generated power sources or voltages to the touch driver STIC, the gate driver GD, or the display panel DP.

In the touch display device 200 according to embodiments of the present disclosure, the panel power unit PMIC and the touch power unit TPIC can be embodied as a single IC.

In the touch display device 200 according to embodiments of the present disclosure, the touch power unit TPIC, the touch driver STIC, the touch controller TCU, and the timing controller TCON can be embodied as a single IC.

The touch controller TCU of the touch display device 200 according to embodiments of the present disclosure controls the touch power unit TPIC such that power sources or voltages required for the touch driver STIC are input to the touch driver STIC. The touch controller TCU can control the touch driver STIC such that it senses a touch which occurs on the display panel DP. At this time, the touch which occurs on the display panel DP can be a touch of a pen, a touch of a finger, or a touch of an object having conductivity. The touch controller TCU receives touch raw data Traw Data sensed by the touch driver STIC and calculates touch coordinates.

In the touch display device 200 according to embodiments of the present disclosure, the touch controller TCU and the touch driver STIC can be embodied as a single IC.

The touch controller TCU according to embodiments of the present disclosure generates a touch source signal required for touch driving and outputs the generated touch source signal to the touch power unit TPIC. The touch source signal can be, for example, a base signal for generating a touch driving signal for sensing a finger touch. The touch controller TCU generates a fingerprint source signal required for sensing a fingerprint and outputs the generated fingerprint source signal to the touch power unit TPIC. The fingerprint source signal can be, for example, a base signal for generating a fingerprint driving signal for sensing a fingerprint of a finger. The touch source signal can be used as a base signal for generating noise reduction signal for reducing an unnecessary parasitic capacitance or noise in the display panel DP when the display panel DP performs touch driving or touch sensing. The touch source signal can be a base signal for generating a pen communication information signal for communication between a pen and the display panel DP. The touch source signal can be a base signal for generating a pen synchronization signal for communication between a pen and the display panel DP.

The touch power unit TPIC of the touch display device 200 according to embodiments of the present disclosure receives the touch source signal from the touch controller TCU and generates and outputs various signals or voltages. The touch power unit TPIC generates a touch driving signal TDS, a fingerprint driving signal FDS, a noise reduction signal NRS, and the like on the basis of the received touch source signal and outputs the generated signals to the touch driver STIC. The touch power unit TPIC outputs a pen communication information signal for communication between the pen and the display panel DP to the touch driver STIC or outputs a pen synchronization signal for communication between the pen and the display panel DP to the touch driver STIC. The touch power unit TPIC outputs the noise reduction signal NRS which is supplied to the data lines DL or the gate lines GL to the touch driver STIC or the gate driver GD.

The noise reduction signal NRS which is supplied to the gate lines GL of the touch display device 200 according to embodiments of the present disclosure is a signal having the same voltage difference and the same phase as the touch driving signal TDS. However, the noise reduction signal NRS which is supplied to the gate lines GL of the touch display device 200 according to embodiments of the present disclosure can have a voltage level different from that of the touch driving signal TDS. For example, when the touch driving signal TDS is a signal changing while repeatedly swinging from 1 V to 5 V, the noise reduction signal NRS which is supplied to the gate lines GL can be a signal changing while repeatedly swinging from −15 V to −11 V. This is because, even when the noise reduction signal NRS is supplied to the gate lines GL in a period in which a finger touch is sensed, the driving transistors (thin-film transistors: TFT) of the pixel areas PXA of the display panel DP in the area has to be maintained in the OFF state to prevent an influence on a display image of the display panel DP.

The noise reduction signal NRS which is supplied to the data lines DL or the gate lines GL of the touch display device 200 according to embodiments of the present disclosure is a signal having the same voltage difference and the same phase as the touch driving signal TDS, but the noise reduction signal NRS may not have the same voltage difference and the same phase as the touch driving signal TDS. The noise reduction signal NRS can be set to be appropriately variable to reduce noise according to necessity.

The timing controller of the touch display device 200 according to embodiments of the present disclosure controls a data driver in the gate driver GD and the touch driver STIC, and transmits image information which is input from the outside to the data driver. The timing controller TCON controls the gate driver GD at an appropriate timing for displaying an image on the display panel DP. The timing controller CON can control touch driving by communicating with the touch controller TCU.

The data driver of the touch display device 200 according to embodiments of the present disclosure can be embodied as a single IC in the touch driver STIC, or can be embodied as a particular IC outside of the touch driver STIC.

The display panel DP of the touch display device 200 according to embodiments of the present disclosure includes a first substrate and a second substrate. The display panel DP includes a backlight unit. Liquid crystal is disposed in the pixel areas PXA between the first substrate and the second substrate, and pixel electrodes and common electrodes are disposed in the pixel areas PXA. The display panel DP generates an electric field between the pixel electrodes and the common electrodes by supplying necessary voltages to appropriate electrodes at appropriate timings. The liquid crystal can be appropriately controlled by the electric field which is generated between the pixel electrodes and the common electrode. Intensity of light emitted from the backlight unit to the pixel areas PXA is changed by the controlled liquid crystal. Accordingly, an appropriate image can be displayed. At this time, the common electrodes disposed in the display panel DP can be used as an electrode for displaying an image and can also be used as a touch electrode TE for sensing a touch input of a finger or a pen. That is, the common electrodes disposed in the display panel DP are connected to the touch lines TL, and the touch lines TL are connected to the touch driver STIC and senses a capacitance generated between the finger FG and the common electrodes or senses a capacitance generated between the pen PEN and the common electrodes to determine where a touch has been input. The display panel DP further includes a sealing layer that prevents the liquid crystal LC in the display panel DP from leaking to the outside.

Touch Electrodes, Touch Lines, and Data Lines

Figure 3:
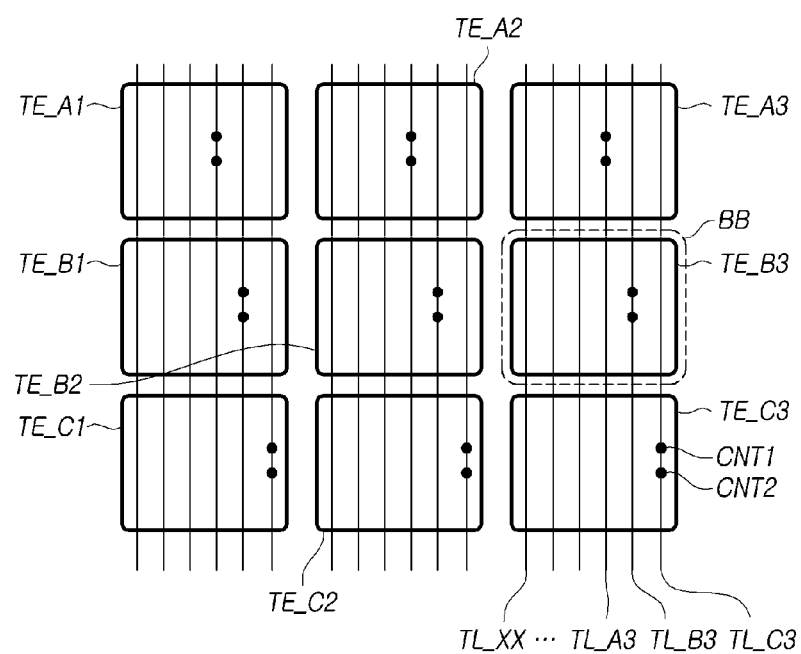
FIG. 3 is an enlarged view schematically illustrating an area "AA" in FIG. 2.

FIG. 3 is an enlarged view schematically illustrating an area "AA" in FIG. 2. In FIG. 3, the data lines DL, the gate lines GL, the pixel areas PXA, and the like are not illustrated for the purpose of convenience. Referring to FIG. 3, the touch display device 200 according to embodiments of the present disclosure includes a plurality of touch electrodes TE_A1, TE_A2, TE_A3, TE_B1, TE_B2, TE_B3, TE_C1, TE_C2, and TE_C3 and a plurality of touch lines TL_XX, TL_A3, TL_B3, and TL_C3 in the display panel DP.

Each of the touch electrodes TE of the touch display device 200 according to embodiments of the present disclosure is electrically connected to the corresponding touch line TL via at least one contact hole CNT. For example, a C3 touch electrode TE_C3 which is disposed at the right-lower end of FIG. 3 is electrically connected to one C3 touch line TL_C3 via two contact holes CNT1 and CNT2, and senses touch information via the C3 touch line TL_C3 when a touch occurs in an area in which the C3 touch electrode TE_C3 is located in a touch electrode sensing period. At this time, the reason why the C3 touch electrode TE_C3 is electrically connected to the C3 touch line TL_C3 via two contact holes CNT1 and CNT2 is that a contact resistance between the C3 touch electrode TE_C3 and the C3 touch line TL_C3 can be decreased. Accordingly, each of the touch electrodes TE of the touch display device 200 according to embodiments of the present disclosure can be connected to the corresponding touch line TL via three or more contact holes. The C3 touch line TL_C3 and the C3 touch electrode TE_C3 can be disposed in different layers and thus the C3 touch line TL_C3 and the C3 touch electrode TE_C3 can be disposed to overlap each other in at least a part.

Similarly, an A3 touch electrode TE_A3 in the touch display device 200 according to embodiments of the present disclosure is electrically connected to one A3 touch line TL_A3 via two contact holes, and senses touch information via the A3 touch line TL_A3 when a touch occurs in an area in which the A3 touch electrode TE_A3 is located in the touch electrode sensing period. A B3 touch electrode TE_B3 in the touch display device 200 according to embodiments of the present disclosure is electrically connected to one B3 touch line TL_B3 via two contact holes, and senses touch information via the B3 touch line TL_B3 when a touch occurs in an area in which the B3 touch electrode TE_B3 is located in the touch electrode sensing period. Further, another touch electrode which is disposed above the A3 touch electrode TE_A3 or below the A3 touch electrode TE_A3 is electrically connected to one XX touch line TL_XX via one or more contact holes, and senses touch information via the XX touch line TL_XX when a touch occurs in an area in which the touch electrode TE is located in the touch electrode sensing period.

The touch electrodes TE_A1, TE_A2, TE_A3, TE_B1, TE_B2, TE_B3, TE_C1, TE_C2, and TE_C3 in the touch display device 200 according to embodiments of the present disclosure can be formed as tubular touch electrodes TE. The touch electrodes TE_A1, TE_A2, TE_A3, TE_B1, TE_B2, TE_B3, TE_C1, TE_C2, and TE_C3 of the touch display device 200 can be formed to include a plurality of slits and a plurality of bridge patterns instead of a tubular shape. In this case, when the touch lines TL are disposed to overlap the touch electrodes TE, the plurality of slits and the plurality of bridge patterns which are formed in the touch electrodes TE can be disposed to overlap the touch lines TL. That is, when the touch lines TL are disposed to overlap the touch electrodes TE, a parasitic capacitance between the touch lines TL and the touch electrodes TE can be minimized by minimizing the overlap area.

The touch electrodes TE of the touch display device 200 according to embodiments of the present disclosure can also serve as common electrodes for display driving. For example, a display image can be displayed on the display panel DP by supplying a common voltage to the touch electrodes TE via the touch lines TL in the display period of the touch display device 200. A touch which occurs in the display panel DP can be sensed and recognized by supplying a touch driving signal TDS to the touch electrodes TE via the touch lines TL in the touch sensing period of the touch display device 200.

Data Lines and Gate Lines Overlapping Touch Electrodes

Figure 4:
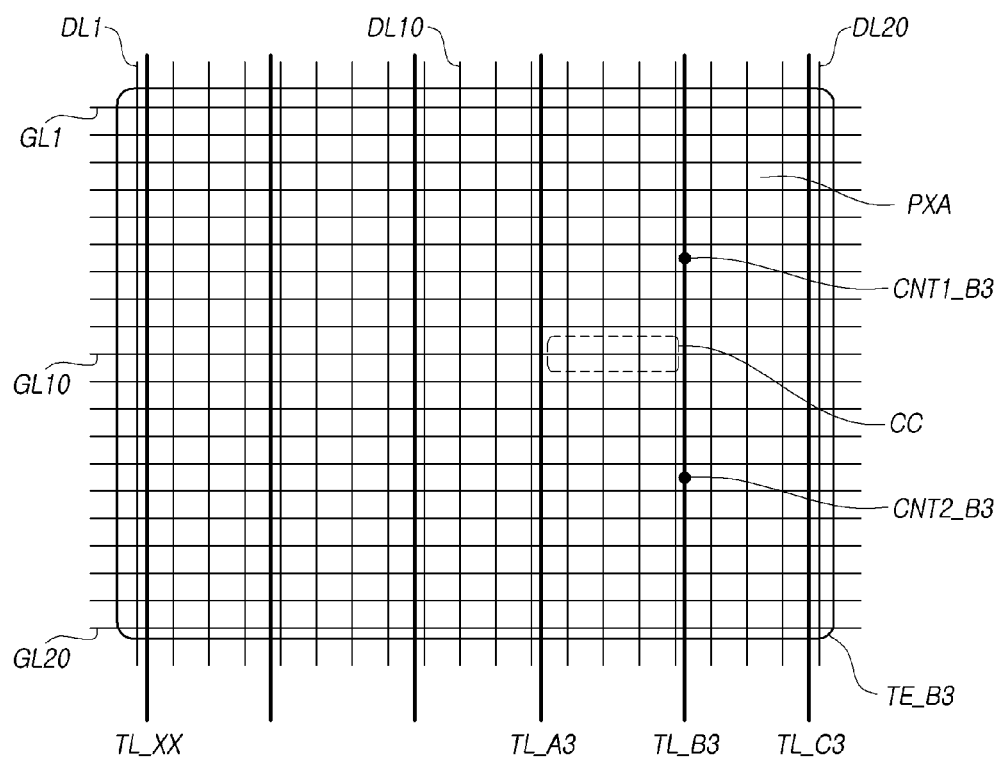
FIG. 4 is an enlarged view schematically illustrating an area "BB" in FIG. 3.

FIG. 4 is an enlarged view schematically illustrating an area "BB" in FIG. 3.

Referring to FIG. 4, the B3 touch electrode TE_B3 of the touch display device 200 according to embodiments of the present disclosure is disposed to overlap the plurality of touch lines TL_XX, TL_A3, TL_B3, and TL_C3. That is, the B3 touch electrode TE_B3 is disposed to overlap the B3 touch line TL_B3 which is electrically connected thereto and to overlap other touch lines TL_XX, TL_A3, and TL_C3 connected other touch electrodes TE. By disposing the touch lines TL_XX, TL_A3, TL_B3, and TL_C3 in the active area DA of the display panel DP similarly to the B3 touch electrode TE_B3 instead of disposing them in the non-display area NDA or a bezel area, it is possible to minimize the size of the non-display area NDA or the bezel area of the display panel DP.

Referring to FIG. 4, the B3 touch electrode TE_B3 in the touch display device 200 according to embodiments of the present disclosure is electrically connected to one B3 touch line TL_B3 via two contact holes in an area of the B3 touch electrode TE_B3. Accordingly, when a touch occurs in the area in which the B3 touch electrode TE_B3 is located, it is possible to sense touch information via the B3 touch line TL_B3 in the touch electrode sensing period.

Referring to FIG. 4, the touch display device 200 according to embodiments of the present disclosure includes a plurality of data lines DL1, . . . , DL10, . . . , DL20 and a plurality of gate lines GL1, . . . , GL10, . . . , GL20 which are arranged to overlap the B3 touch electrode TE_B3 in the display panel DP. At this time, the plurality of data lines DL1, . . . , DL10, . . . , DL20 includes 20 data lines of first to twentieth data lines DL1 to DL20. The plurality of gate lines GL1, . . . , GL10, . . . , GL20 include 20 gate lines of first to twentieth gate lines GL1 to GL20. This is only an example, and the number of data lines overlapping the B3 touch electrode TE_B3 can be larger or smaller than 20. The number of gate lines overlapping the B3 touch electrode TE_B3 can be larger or smaller than 20.

A plurality of touch lines TL_XX, TL_A3, TL_B3, and TL_C3 of the touch display device 200 according to embodiments of the present disclosure are disposed to overlap the plurality of data lines DL1, . . . , DL10, . . . , DL20. However, the present disclosure is not limited thereto and the plurality of touch lines TL_XX, TL_A3, TL_B3, and TL_C3 can be disposed not to overlap the plurality of data lines DL1, . . . , DL10, . . . , DL20. As illustrated in FIG. 4, the plurality of touch lines TL_XX, TL_A3, TL_B3, and TL_C3 are disposed to overlap the plurality of gate lines GL1, . . . , GL10, . . . , GL20.

Referring to FIG. 4, the touch display device 200 according to embodiments of the present disclosure includes a plurality of pixel areas PXA which are disposed close to each other between the plurality of data lines DL1, . . . , DL10, . . . , DL20 and the plurality of gate lines GL1, . . . , GL10, . . . , GL20. Accordingly, the area of the B3 touch electrode TE_B3 includes a plurality of pixel areas PXA. That is, since an area of one B3 touch electrode TE_B3 includes a plurality of pixel areas PXA, the area of one B3 touch electrode TE_B3 includes several or several hundreds of pixel areas PXA. Referring to FIG. 4, the number of pixel areas PXA which are arranged close to each other between 20 data lines DL1, . . . , DL10, . . . , DL20 and 20 gate lines GL1, . . . , GL10, . . . , GL20 is 20×20=400. That is, referring to FIG. 4, the number of pixel areas PXA overlapping one B3 touch electrode TE_B3 is 400 (=20×20).

Figure 5:
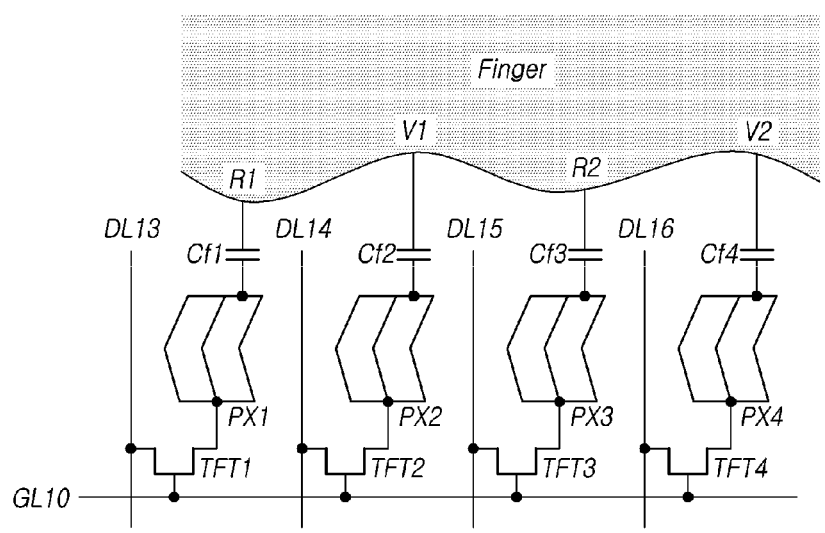
FIG. 5 is an enlarged view schematically illustrating an area "CC" in FIG. 4.

FIG. 5 is an enlarged view schematically illustrating an area "CC" in FIG. 4. Referring to FIG. 5, the touch display device 200 according to embodiments of the present disclosure includes a plurality of pixel electrodes PX1, PX2, PX3, and PX4 and a plurality of thin-film transistors TFT1, TFT2, TFT3, and TFT4 which are arranged close to each other between a plurality of data lines DL13, DL14, DL15, and DL16 and the gate line GL10.

Referring to FIG. 5, the touch display device 200 according to embodiments of the present disclosure supplies a fingerprint driving signal FDS to the pixel electrodes PX via the data lines DL, senses capacitances which are generated between the pixel electrodes PX and a fingerprint, and recognizes the fingerprint.

In general, a fingerprint includes a plurality of ridges corresponding to parts which are formed by partial outermost skins protruding and a plurality of valleys which are located between the protruding parts. Referring to FIG. 5, in the touch display device 200 according to embodiments of the present disclosure, when a finger approaches the display panel DP, a first capacitance Cf1 is formed between a first ridge R1 and a first pixel electrode PX1 of a fingerprint formed in a finger, a second capacitance Cf2 is formed between a first valley V1 and a second pixel electrode PX2 of the fingerprint formed in the finger, a third capacitance Cf3 is formed between a second ridge R1 and a third pixel electrode PX3 of the fingerprint formed in the finger, and a fourth capacitance Cf4 is formed between a second valley V2 and a fourth pixel electrode PX4 of the fingerprint formed in the finger, Referring to FIG. 5, the touch display device 200 according to embodiments of the present disclosure can sense capacitances formed between the pixel electrodes PX and the ridges or the valleys of the fingerprint via the data lines DL13, DL14, DL15, and DL16 which are electrically connected to the pixel electrodes PX1, PX2, PX3, and PX4. That is, the capacitances can be sensed by supplying a gate driving voltage for turning on a plurality of thin-film transistors TFT1, TFT2, TFT3, and TFT4 via the gate line GL10 and supplying a fingerprint driving signal FDS via the data lines DL13, DL14, DL15, and DL16.

At this time, since persons' fingerprints have different sizes and shapes, the ridges or the valleys do not correspond to the pixel electrodes PX in a one-to-one manner. That is, in the case of a fingerprint with large ridges or valleys, the size of each ridge or valley can correspond to two or three or more pixel electrodes. In this case, when a fingerprint is sensed using ridges and valleys of the fingerprint, the sensed fingerprint is compared with fingerprint patterns registered in advance to determine identity and thus it is possible to recognize a fingerprint pattern.

Figure 6:
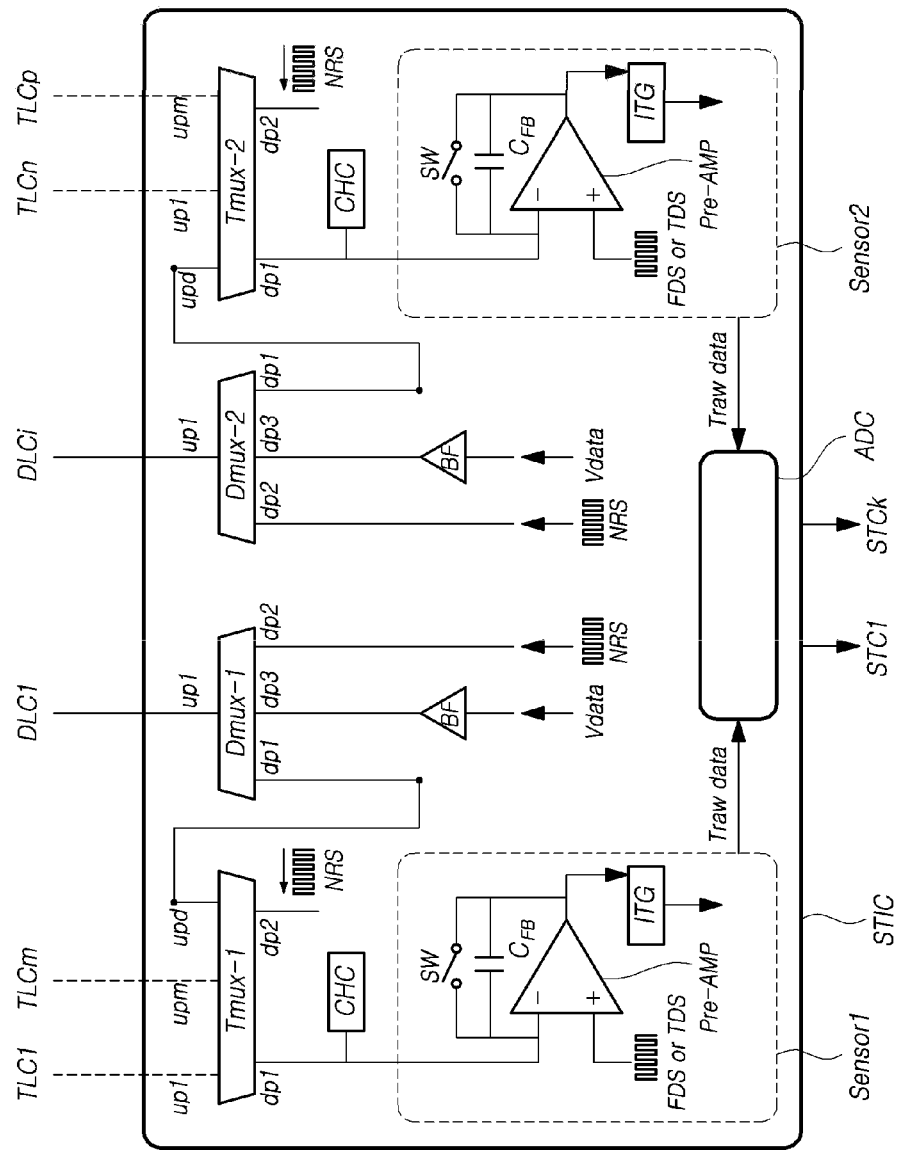
FIG. 6 is a diagram schematically illustrating a touch driver of the touch display device according to embodiments of the present disclosure.

FIG. 6 is a diagram schematically illustrating the touch driver STIC of the touch display device 200 according to embodiments of the present disclosure.

Referring to FIG. 6, the touch driver STIC of the touch display device 200 according to embodiments of the present disclosure includes a plurality of touch line channel portions TLC1, TLCm, TLCn, and TLCp, a plurality of data line channel portions DLC1 and DLCi, a plurality of touch line multiplexers Tmux-1 and Tmux-2, a plurality of data line multiplexers Dmux-1 and Dmux-2, a plurality of touch sensors Sensor1 and Sensor2, an analog-to-digital converter ADC, and a plurality of touch output channel portions STC1 and STCk. The touch driver STIC of the touch display device 200 illustrated in FIG. 6 is only a schematic example and the numbers of elements can be set to one or two or more. That is, the numbers of elements in the touch driver STIC of the touch display device 200 according to embodiments of the present disclosure are not limited.

Referring to FIG. 6, the touch driver STIC of the touch display device 200 according to embodiments of the present disclosure further includes a charge controller CHC that is disposed between the first touch sensor Sensor1 and the first touch multiplexer Tmux-1 or between the second touch sensor Sensor2 and the second touch multiplexer Tmux-2 and that controls an amount of electric charge (or voltage) accumulated in the touch lines TL or the touch electrodes TE. The first touch sensor Sensor1 and the second touch sensor Sensor2 of the touch display device 200 according to embodiments of the present disclosure each include a feedback capacitor Cfb, a feedback switch SW, a pre-amplifier Pre-Amp, and an integrator ITG.

The touch driver STIC of the touch display device 200 according to embodiments of the present disclosure transmits a signal which is generated due to a touch of a finger (or a pen) or a touch of a finger to the first touch sensor Sensor1 or the second touch sensor Sensor2. The integrator of the first touch sensor Sensor1 integrates a value (an amount of electric charge, a voltage value) output from the pre-amplifier Pre-Amp of the first touch sensor Sensor1 two or more times and outputs touch raw data Traw Data. Similarly, the integrator of the second touch sensor Sensor2 integrates a value (an amount of electric charge, a voltage value) output from the pre-amplifier Pre-Amp of the second touch sensor Sensor2 two or more times and outputs touch raw data Traw Data. The analog-to-digital converter ADC included in the touch driver STIC converts the touch raw data Traw Data of the analog values (amounts of electric charge, voltage values) output from the touch sensors Sensor1 and Sensor2 to digital values and outputs the digital values via the plurality of touch output channel portions STC1 and STCk.

Referring to FIG. 6, the first touch line multiplexer Tmux-1 of the touch display device 200 according to embodiments of the present disclosure is disposed between the plurality of touch line channel portions TLC1 and TLCm and the first touch sensor Sensor1. The first touch line multiplexer Tmux-1 includes a first up-terminal up1 that is connected to the first touch line channel portion TLC1, an m-th up-terminal upm that is connected to the m-th touch line channel portion TLCm, a first down-terminal dp1 that is connected to the first touch sensor Sensor1, and a second down-terminal dp2 that is supplied with a noise reduction signal NRS. The first touch line multiplexer Tmux-1 includes a data terminal upd that is supplied with an output signal of the first down-terminal dp1 of the first data line multiplexer Dmux-1.

Similarly, referring to FIG. 6, the second touch line multiplexer Tmux-2 of the touch display device 200 according to embodiments of the present disclosure is disposed between the plurality of touch line channel portions TLCn and TLCp and the second touch sensor Sensor2. The second touch line multiplexer Tmux-2 includes a first up-terminal up1 that is connected to the n-th touch line channel portion TLCn, an m-th up-terminal upm that is connected to the p-th touch line channel portion TLCp, a first down-terminal dp1 that is connected to the second touch sensor Sensor2, and a second down-terminal dp2 that is supplied with a noise reduction signal NRS. The second touch line multiplexer Tmux-2 includes a data terminal upd that is supplied with an output signal of the first down-terminal dp1 of the second data line multiplexer Dmux-2.

Referring to FIG. 6, the first touch line multiplexer Tmux-1 selectively transmits a touch driving signal TDS to the plurality of touch lines TL arranged in the display panel DP via the plurality of touch line channel portions TLC1 and TLCm in accordance with a control signal. At this time, the touch driver STIC is supplied with a touch driving signal TDS from an IC such as the touch controller TCU or the touch power unit TPIC. The first touch line multiplexer Tmux-1 selectively transmits a noise reduction signal NRS to the plurality of touch lines TL arranged in the display panel DP via the plurality of touch line channel portions TLC1 and TLCm in accordance with a control signal. For example, the first touch line multiplexer Tmux-1 transmits the touch driving signal TDS to the touch lines connected to the touch electrodes TE which are to be sensed and transmits the noise reduction signal NRS to the touch lines connected to the touch electrodes TE which are not to be sensed in accordance with the control signal.

Similarly, referring to FIG. 6, the second touch line multiplexer Tmux-2 selectively transmits a touch driving signal TDS to the plurality of touch lines TL arranged in the display panel DP via the plurality of touch line channel portions TLCn and TLCp in accordance with a control signal. At this time, the touch driver STIC is supplied with a touch driving signal TDS from an IC such as the touch controller TCU or the touch power unit TPIC. The second touch line multiplexer Tmux-2 selectively transmits a noise reduction signal NRS to the plurality of touch lines TL arranged in the display panel DP via the plurality of touch line channel portions TLCn and TLCp in accordance with a control signal. For example, the second touch line multiplexer Tmux-2 transmits the touch driving signal TDS to the touch lines connected to the touch electrodes TE which are to be sensed and transmits the noise reduction signal NRS to the touch lines connected to the touch electrodes TE which are not to be sensed in accordance with the control signal.

The first touch line multiplexer Tmux-1 is supplied with an output signal of the first down-terminal dp1 of the first data line multiplexer Dmux-1 and transmits the output signal to the first touch sensor Sensor1 in accordance with a control signal. At this time, the signal supplied from the first down-terminal dp1 of the first data line multiplexer Dmux-1 is a signal supplied via the first data line and associated with a fingerprint touching a pixel area PXA. The second touch line multiplexer Tmux-2 is supplied with an output signal of the first down-terminal dp1 of the second data line multiplexer Dmux-2 and transmits the output signal to the second touch sensor Sensor2 in accordance with a control signal. At this time, the signal supplied from the first down-terminal dp1 of the second data line multiplexer Dmux-2 is a signal supplied via the i-th data line and associated with a fingerprint touching a pixel area PXA. Details of fingerprint driving and fingerprint sensing will be described later in detail.

The touch display device 200 according to embodiments of the present disclosure senses a touch change which occurs in the plurality of touch electrode areas via a plurality of touch lines TL and the plurality of touch electrodes TE which are arranged in the display panel DP. Referring to FIG. 6, the first touch sensor Sensor1 of the touch driver STIC according to embodiments of the present disclosure can sense a touch by supplying a touch driving signal TDS to the plurality of touch lines TL and the plurality of touch electrodes TE which are arranged in the display panel DP via the plurality of touch line channel portions TLC1 and TLCm in the touch sensing period. Similarly, the second touch sensor Sensor2 of the touch driver STIC according to embodiments of the present disclosure can sense a touch by supplying a touch driving signal TDS to the plurality of touch lines TL and the plurality of touch electrodes TE which are arranged in the display panel DP via the plurality of touch line channel portions TLCn and TLCp in the touch sensing period. For example, when the touch driving signal TDS is supplied to a + input terminal (referred to as a positive input terminal or a non-inverting input terminal) of the pre-amplifier Pre-Amp of the first touch sensor Sensor1, the touch driving signal TDS is transmitted to the touch lines TL and the touch electrodes TE via the first touch line multiplexer Tmux-1 which is electrically connected to a − input terminal (referred to as a negative input terminal or an inverted input terminal) of the pre-amplifier Pre-Amp. At this time, when there is no touch with the touch display device 200, an amount of electric charge accumulated in the touch electrodes TE changes and this change in an amount of electric charge causes an output of the pre-amplifier Pre-Amp via the feedback switch SW and the feedback capacitor Cfb. The output of the amount of electric charge is converted to a value which is accumulated by the integrator ITG. The amount of electric charge accumulated by the integrator ITC is transmitted as touch raw data Traw Data to the analog-to-digital converter ADC. The analog-to-digital converter ADC transmits the touch raw data Traw Data to the touch controller TCU via at least one touch output channel portion STC1 or STCk. The touch controller TCU generates touch coordinates of a position at which a touch occurs in the display panel DP on the basis of the touch raw data Traw Data for the touch and outputs the generated touch coordinates to a host system of the display device.

The touch display device 200 according to embodiments of the present disclosure can sense a fingerprint touching a plurality of pixel areas PXA via a plurality of data lines DL and a plurality of pixel electrodes PX which are arranged in the display panel DP. Referring to FIG. 6, the first touch sensor Sensor1 of the touch driver STIC according to embodiments of the present disclosure supplies a fingerprint driving signal FDS to the plurality of data lines DL and the plurality of pixel electrodes PX via the first touch line multiplexer Tmux-1 and the first data line multiplexer Dmux-1 in the fingerprint sensing period and senses a fingerprint in the corresponding area. Similarly, the second touch sensor Sensor2 of the touch driver STIC according to embodiments of the present disclosure supplies a fingerprint driving signal FDS to the plurality of data lines DL and the plurality of pixel electrodes PX via the second touch line multiplexer Tmux-2 and the second data line multiplexer Dmux-2 in the fingerprint sensing period and senses a fingerprint in the corresponding area. For example, when the fingerprint driving signal FDS is supplied to the + input terminal of the pre-amplifier Pre-Amp of the first touch sensor Sensor1, the finger driving signal FDS is transmitted to the data lines DL and the touch electrodes TE which are electrically connected to the − input terminal of the pre-amplifier Pre-Amp. At this time, a change in capacitance of each pixel electrode PX corresponding to the ridges and the valleys of the fingerprint touching the touch display device 200 causes an output of the pre-amplifier Pre-Amp via the feedback switch SW and the feedback capacitor Cfb. The output of the amount of electric charge is converted to a value which is accumulated by the integrator ITG. The amount of electric charge accumulated by the integrator ITC is transmitted as touch raw data Traw Data to the analog-to-digital converter ADC. The analog-to-digital converter ADC transmits the touch raw data Traw Data to the touch controller TCU via at least one touch output channel portions STC1 and STCk. The touch controller TCU generates touch coordinates of a position at which a touch occurs in the display panel DP on the basis of the touch raw data Traw Data for the touch and outputs the generated touch coordinates to a host system of the display device (the touch display device 200 or a device including it).

Referring to FIG. 6, the first data line multiplexer Dmux-1 of the touch display device 200 according to embodiments of the present disclosure includes a first up-terminal up1 that is connected to the first data line channel portion DLC1, a first down-terminal dp1 that is connected to the data terminal upd of the first touch line multiplexer Tmux-1, a third down-terminal that is supplied with a data voltage Vdata, and a second down-terminal dp2 that is supplied with a noise reduction signal NRS.

Similarly, referring to FIG. 6, the second data line multiplexer Dmux-2 of the touch display device 200 according to embodiments of the present disclosure includes a first up-terminal up1 that is connected to the i-th data line channel portion DLCi, a first down-terminal dp1 that is connected to the data terminal upd of the second touch line multiplexer Tmux-2, a third down-terminal that is supplied with a data voltage Vdata, and a second down-terminal dp2 that is supplied with a noise reduction signal NRS.

Referring to FIG. 6, the first data line multiplexer Dmux-1 transmits the data voltage Vdata to the data lines DL arranged in the display panel DP via the first data line channel portion DLC1 in accordance with a control signal. At this time, the touch driver STIC is supplied with information corresponding to the data voltage Vdata from an IC such as the timing controller ICON, performs a process of sequentially supplying the data voltage Vdata to the display panel DP, and transmits the data voltage Vdata to the first data line multiplexer Dmux-1 via a buffer BF such that it can be transmitted to the data lines DL. Accordingly, data information supplied from the outside can be converted to the data voltage Vdata and supplied to the corresponding pixel electrodes PX via the data lines DL. At this time, the gate lines GL arranged in the display panel DP are controlled such that the driving transistors TFT disposed in the pixel areas PXA are controlled (turned on or off) to supply the data voltage Vdata to appropriate pixel electrodes PX.

Similarly, referring to FIG. 6, the second data line multiplexer Dmux-2 transmits the data voltage Vdata to the data lines DL arranged in the display panel DP via the i-th data line channel portion DLCi in accordance with a control signal. At this time, the touch driver STIC is supplied with information corresponding to the data voltage Vdata from an IC such as the timing controller ICON, performs a process of sequentially supplying the data voltage Vdata to the display panel DP, and transmits the data voltage Vdata to the second data line multiplexer Dmux-2 via a buffer BF such that it can be transmitted to the data lines DL. Accordingly, data information supplied from the outside can be converted to the data voltage Vdata and supplied to the corresponding pixel electrodes PX via the data lines DL. At this time, the gate lines GL arranged in the display panel DP are controlled such that the driving transistors TFT disposed in the pixel areas PXA are controlled (turned on or off) to supply the data voltage Vdata to appropriate pixel electrodes PX.

Referring to FIG. 6, the first data line multiplexer Dmux-1 of the touch display device 200 according to embodiments of the present disclosure transmits the noise reduction signal NRS to the data lines DL arranged in the display panel DP via the first data line channel portion DLC1 in accordance with a control signal. Similarly, the second data line multiplexer Dmux-2 transmits the noise reduction signal NRS to the data lines DL arranged in the display panel DP via the i-th data line channel portion DLCi in accordance with a control signal. When the touch driving signal TDS or the fingerprint driving signal FDS is supplied to the touch electrodes TE or the pixel electrodes PX in the finger (or pen) touch driving and sensing periods or the fingerprint driving and sensing periods, the touch display device 200 according to embodiments of the present disclosure can supply the noise reduction signal NRS to the electrodes arranged around the sensed touch electrodes TE or the sensed pixel electrodes PX to prevent or decrease possible noise in order to decrease noise or parasitic capacitances due to the peripheral electrodes. The touch display device 200 according to embodiments of the present disclosure can generate and supply a noise reduction signal NRS having the same phase or the same voltage difference or the same frequency as the touch driving signal TDS or the fingerprint driving signal FDS. However, the noise reduction signal NRS does not have to have the same phase or the same voltage difference or the same frequency as the touch driving signal TDS or the fingerprint driving signal FDS. In order to reduce noise, the noise reduction signal NRS can have a phase or a voltage difference or a frequency similar to those of the touch driving signal TDS or the fingerprint driving signal FDS.

In the touch display device 200 according to embodiments of the present disclosure, signals (for example, a first capacitance Cf1, a second capacitance Cf2, a third capacitance Cf3, and a fourth capacitance Cf4) which are generated due to a fingerprint touching the pixel areas PXA arranged in the display panel DP are transmitted to the first touch sensor Sensor1 via the first data line multiplexer Dmux-1 and the first touch line multiplexer Tmux-1. That is, the first down-terminal dp1 of the first data line multiplexer Dmux-1 and the data terminal upd of the first touch line multiplexer Tmux-1 are electrically connected to each other and the signals which are generated due to a fingerprint and transmitted via the data lines DL corresponding to the fingerprint sensing area TSA are transmitted to the first touch sensor Sensor1. In FIG. 6, the first down-terminal dp1 of the first data line multiplexer Dmux-1 and the data terminal upd of the first touch line multiplexer Tmux-1 are electrically connected to each other and the signals which are generated due to a fingerprint are transmitted to the first touch sensor Sensor1, but the touch driver STIC according to embodiments of the present disclosure is not limited thereto. For example, a particularly line selection multiplexer Multiplexer can be disposed between the first down-terminal dp1 of the first data line multiplexer Dmux-1 and the first touch sensor Sensor1 to electrically connect the particularly line selection multiplexer Multiplexer and the first down-terminal dp1 of the first data line multiplexer Dmux-1. Accordingly, the fingerprint driving signal FDS can be supplied to the data lines DL corresponding to the fingerprint sensing area TSA. That is, the line selection multiplexer Multiplexer can select one of the first down-terminal dp1 of the first data line multiplexer Dmux-1 and the data terminal upd of the first touch line multiplexer Tmux-1 and transmit the signals based on a fingerprint to the first touch sensor Sensor1. In other words, the signals based on a fingerprint can be transmitted without using electrical connection between the data terminal upd of the first touch line multiplexer Tmux-1 and the first down-terminal dp1 of the first data line multiplexer Dmux-1.

Similarly, in the touch display device 200 according to embodiments of the present disclosure, signals (for example, a first capacitance Cf1, a second capacitance Cf2, a third capacitance Cf3, and a fourth capacitance Cf4) which are generated due to a fingerprint touching the pixel areas PXA arranged in the display panel DP are transmitted to the second touch sensor Sensor2 via the second data line multiplexer Dmux-2 and the second touch line multiplexer Tmux-2. That is, the first down-terminal dp1 of the second data line multiplexer Dmux-2 and the data terminal upd of the second touch line multiplexer Tmux-2 are electrically connected to each other and the signals which are generated due to a fingerprint and transmitted via the data lines DL are transmitted to the second touch sensor Sensor2. In FIG. 6, the first down-terminal dp1 of the second data line multiplexer Dmux-2 and the data terminal upd of the second touch line multiplexer Tmux-2 are electrically connected to each other and the signals which are generated due to a fingerprint are transmitted to the second touch sensor Sensor2, but the touch driver STIC according to embodiments of the present disclosure is not limited thereto. For example, a particularly line selection multiplexer Multiplexer can be disposed between the first down-terminal dp1 of the second data line multiplexer Dmux-2 and the second touch sensor Sensor2 to electrically connect the particularly line selection multiplexer Multiplexer and the first down-terminal dp1 of the second data line multiplexer Dmux-2. Accordingly, the fingerprint driving signal FDS can be supplied to the data lines DL corresponding to the fingerprint sensing area TSA. That is, the line selection multiplexer Multiplexer can select one of the first down-terminal dp1 of the second data line multiplexer Dmux-2 and the data terminal upd of the second touch line multiplexer Tmux-2 and transmit the signals based on a fingerprint to the second touch sensor Sensor2. In other words, the signals based on a fingerprint can be transmitted without using electrical connection between the data terminal upd of the second touch line multiplexer Tmux-2 and the first down-terminal dp1 of the second data line multiplexer Dmux-2.

The touch display device 200 according to embodiments of the present disclosure can sense a signal change based on a fingerprint touching a plurality of pixel areas PXA via the plurality of data lines DL and the plurality of pixel electrodes PX arranged in the display panel DP. Referring to FIG. 6, in the fingerprint sensing period, the first touch sensor Sensor1 of the touch driver STIC according to embodiments of the invention supplies the fingerprint driving signal FDS to the first data line DL1 disposed in the display panel DP and the corresponding pixel electrodes PX via the first data line channel portion DLC1 and sense the fingerprint.

Similarly, in the fingerprint sensing period, the second touch sensor Sensor2 of the touch driver STIC according to embodiments of the invention supplies the fingerprint driving signal FDS to the i-th data line DLi disposed in the display panel DP and the corresponding pixel electrodes PX via the i-th data line channel portion DLCi and sense the fingerprint.

For example, when the fingerprint driving signal FDS is supplied to the + input terminal of the pre-amplifier Pre-Amp of the first touch sensor Sensor1, the fingerprint driving signal FDS is transmitted to the first data line DL1 connected via the first touch line multiplexer Tmux-1 and the first data line multiplexer Dmux-1 electrically connected to the − input terminal of the pre-amplifier Pre-Amp and the corresponding pixel electrodes PX. Similarly, when the fingerprint driving signal FDS is supplied to the + input terminal of the pre-amplifier Pre-Amp of the second touch sensor Sensor2, the fingerprint driving signal FDS is transmitted to the i-th data line DLi connected via the second touch line multiplexer Tmux-2 and the second data line multiplexer Dmux-2 electrically connected to the − input terminal of the pre-amplifier Pre-Amp and the corresponding pixel electrodes PX. At this time, a capacitance is generated between one ridge of a fingerprint and at least one corresponding pixel electrode on the touch display device 200 and between one valley of the fingerprint and at least one corresponding pixel electrode PX. A change of the generated capacitance causes an output of the pre-amplifier Pre-Amp via the feedback switch SW and the feedback capacitor Cfb of the first touch sensor Sensor1 or the second touch sensor Sensor2. The output of the pre-amplifier Pre-Amp is converted to a value which is accumulated by the integrator ITG. The amount of electric charge accumulated by the integrator ITG is transmitted as touch raw data Traw Data to the analog-to-digital converter ADC. The analog-to-digital converter ADC transmits the touch raw data Traw Data to the touch controller TCU via at least one touch output channel portion STC1 or STCk. The touch controller TCU generates touch coordinates of a position at which a touch occurs in the display panel DP on the basis of the touch raw data Traw Data for the touch and outputs the generated touch coordinates to a host system of the display device.

The touch display device 200 according to embodiments of the present disclosure includes common electrodes and pixel electrodes PX for displaying a display image in the display panel DP. The plurality of common electrodes incorporated into the display panel DP serve as common electrodes for display and also serve as touch electrodes TE for touch sensing. The plurality of pixel electrodes PX incorporated into the display panel DP serve as pixel electrodes PX for display and also serve as fingerprint sensing electrodes PX for fingerprint sensing.

Figure 7:
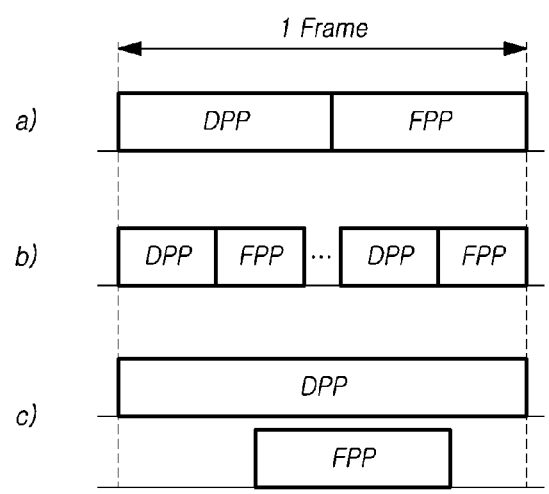
FIG. 7 is a diagram schematically illustrating a display period and a fingerprint sensing period in one frame period of the touch display device according to embodiments of the present disclosure.

FIG. 7 is a diagram schematically illustrating a display period DPP and a fingerprint sensing period FPP in a first frame period 1Frame of the touch display device 200 according to embodiments of the present disclosure.

Referring to (a) of FIG. 7, the touch display device 200 according to embodiments of the present disclosure can provide one display period DPP and one fingerprint sensing period FPP in a first frame period 1Frame and be divisionally driven in a 1:1 time division manner or X:Y time division manner (where X and Y are natural numbers). Here, one frame period of the touch display device 200 is defined as a period in which a display image is updated by supplying a display image-relevant data voltage Vdata to the pixel electrodes PX arranged in the display panel DP. That is, one frame period is defined as a period in which an image is updated on the display panel DP. For example, when the touch display device 200 employs a 60 Hz driving system, 60 images can be updated per second on the display panel DP. In this case, one frame period is about 1.6 ms corresponding to 1/60 seconds. A system in which one frame period is divided into a display period DPP and a fingerprint sensing period FPP is referred to as a time-division driving system.

Referring to (b) of FIG. 7, the touch display device 200 can be divisionally driven such that the display period DPP and the fingerprint sensing period FPP alternate two times in one frame period 1Frame. This driving system is also referred to as a time-division driving system.

Referring to (c) of FIG. 7, the display period DPP and the fingerprint sensing period FPP can progress simultaneously in one frame period 1Frame. That is, fingerprint sensing can be performed at the same time as updating a display image which is displayed on the display panel DP in the display period DPP such that the display period DPP and the fingerprint sensing period FPP progress independently. This driving system is referred to as a simultaneous driving system. This simultaneous driving system can be realized by supplying a fingerprint driving signal FDS to the display panel DP while supplying image data to the data lines DL in embodiments of the present disclosure. In the following embodiments of the present disclosure, the time-division driving system will be mainly described for the purpose of convenience. That is, a driving system in which the display period DPP in which an image is updated on the display panel DP and the fingerprint sensing period FPP progress time-divisionally will be mainly described below.

Figure 8:
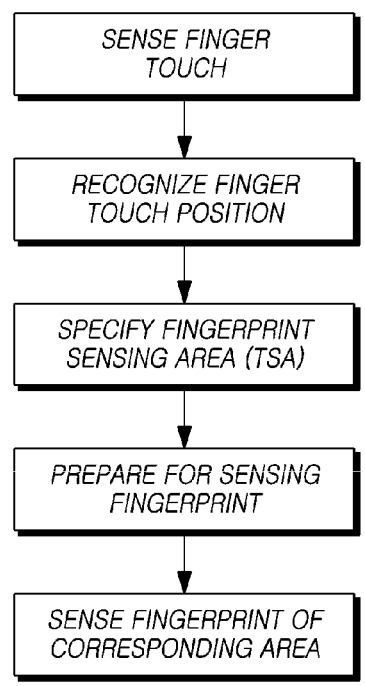
FIG. 8 is a flowchart schematically illustrating a process flow of sensing a fingerprint in the touch display device according to embodiments of the present disclosure.

FIG. 8 is a flowchart schematically illustrating a process flow of sensing a fingerprint in the touch display device 200 according to embodiments of the present disclosure. Referring to FIG. 8, the touch display device 200 according to embodiments of the present disclosure can finally recognize a fingerprint touching a fingerprint sensing area TSA (a step of sensing a fingerprint of the corresponding area) by sensing a finger touch touching the touch display device 200 (a step of sensing a finger touch), recognizing a position at which the finger touch occurs (a step of recognizing a finger touch), specifying a finger sensing area TSA on the basis of the position at which the finger touch has occurred, and preparing for the touch display device 200 to sense at least a part of the fingerprint sensing area TSA (a step of preparing for sensing a fingerprint).

The touch display device 200 according to embodiments of the present disclosure can periodically sense and determine a touch with the display panel DP.

That is, the touch display device 200 can periodically recognize whether a touch has occurred by sensing a finger touch occurring on the display panel DP and determine an area in which the touch has occurred. When it is recognized that a touch has occurred, the area in which the touch has occurred can be specified. When the area in which the touch has occurred is specified, touch electrodes TE of positions at which the touch has occurred can be specified. A fingerprint sensing area TSA can be specified on the basis of the touch electrodes TE of the positions at which the touch has occurred. That is, the fingerprint sensing area TSA can be specified on the basis of the number of touch electrodes TE located at the positions at which the touch has occurred, a degree of closeness or a degree of separation of the touch electrodes TE at the positions at which the touch has occurred, or the like. In other words, the fingerprint sensing area TSA can be specified on the basis of the density of the touch electrodes TE in which a value of the touch raw data Traw Data is equal to or greater than a predetermined reference value. When the fingerprint sensing area TSA is specified, fingerprint sensing in the corresponding area can be performed through the step of preparing for fingerprint sensing. That is, ridges and valleys of a fingerprint touching the corresponding fingerprint sensing area TSA can be sensed to generate a fingerprint pattern and it can be determined whether the sensed fingerprint of the corresponding area is identical to a fingerprint pattern which is registered in advance by comparing the generated fingerprint pattern with the registered fingerprint pattern.

Referring to FIG. 8, when a finger approaches the display panel DP and a finger touch occurs, the touch display device 200 according to embodiments of the present disclosure senses a touch of a finger using the touch driver STIC and recognizes a position at which the finger touch has occurred. Recognizing a touch and a touch position of a finger means that it is found in what touch electrodes TE out of the touch electrodes TE arranged in the display panel DP the finger is located and in how many touch electrodes TE the touch has occurred. For the purpose of fingerprint sensing, from what area of the display panel DP a fingerprint has to be sensed is specified. In a method of specifying a fingerprint sensing area TSA, the fingerprint sensing area TSA can be specified in advance by software. An example in which the fingerprint sensing area TSA is specified by a finger touch will be described below.

When a user touches the display panel DP with a finger for the purpose of fingerprint sensing, the size of a touched area can be different from that at the time of a general finger touch. For example, a general finger touch can occur concentrically on one or two touch electrodes TE, and a finger touch for fingerprint sensing can occur concentrically on three or more touch electrodes TE. This is because, when a fingerprint is sensed using a finger, a user has to approach and touch the display panel DP with a finger such that a broader area is touched. Accordingly, after occurrence of a finger touch has been recognized, the fingerprint sensing area TSA can be specified using a difference in the size of such a touched area. After the fingerprint sensing area TSA has been specified, preparing for fingerprint sensing is performed on the corresponding area. In the step of preparing for fingerprint sensing, a predetermined pattern (a black or white or specific pattern image) or a predetermined voltage is displayed or supplied on or to the corresponding area such that fingerprint sensing is not hindered. That is, since the touch display device 200 according to embodiments of the present disclosure senses a fingerprint using the data lines DL and the pixel electrodes PX, a process of initializing the data lines DL and the pixel electrodes PX of the corresponding area needs to be performed. When the step of preparing for fingerprint sensing in the corresponding area is completed, fingerprint sensing is performed using the data lines DL and the pixel electrodes PX arranged in the display panel DP in the fingerprint sensing period FPP.

Figure 9:
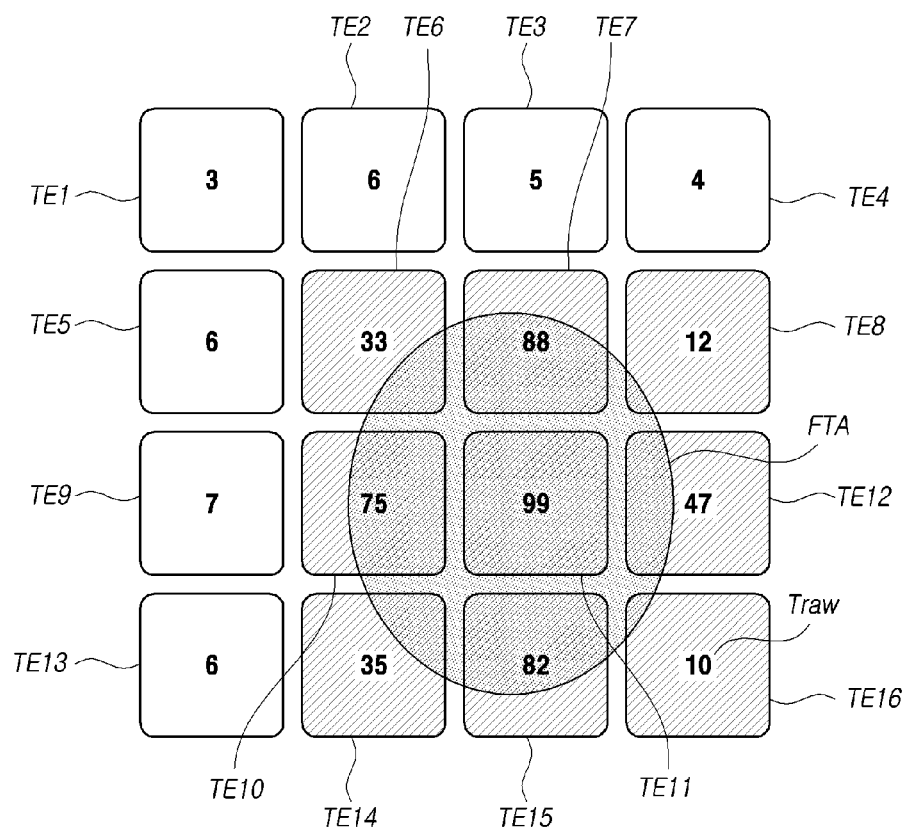
FIG. 9 is a diagram illustrating an example of touch electrodes in a display panel of the touch display device according to embodiments of the present disclosure which are touched with a finger.

FIG. 9 is a diagram illustrating an example of touch electrodes in the display panel DP of the touch display device 200 according to embodiments of the present disclosure which are touched with a finger. Referring to FIG. 9, the touch display device 200 according to embodiments of the present disclosure includes a plurality of touch electrodes TE1, TE2, TE3, TE4, TE5, TE6, TE7, TE8, TE9, TE10, TE11, TE12, TE13, TE14, TE15, and TE16.

Referring to FIG. 9, hatched touch electrodes TE6, TE7, TE8, TE10, TE11, TE12, TE14, TE15, and TE16 out of the plurality of touch electrodes TE1, TE2, TE3, TE4, TE5, TE6, TE7, TE8, TE9, TE10, TE11, TE12, TE13, TE14, TE15, and TE16 are touch electrodes TE which are touched with a finger and which exhibits a touch raw value Traw equal to or greater than a specific reference. The hatched touch electrodes TE6, TE7, TE8, TE10, TE11, TE12, TE14, TE15, and TE16 are touch electrodes TE which overlap at least a finger touch area FTA.

Referring to FIG. 9, the touch raw value Traw of the first touch electrode TE1 is "3," the touch raw value Traw of the second touch electrode TE2 is "6," the touch raw value Traw of the third touch electrode TE3 is "5," the touch raw value Traw of the fourth touch electrode TE4 is "4," the touch raw value Traw of the fifth touch electrode TE5 is "6," the touch raw value Traw of the sixth touch electrode TE6 is "33," the touch raw value Traw of the seventh touch electrode TE7 is "88," the touch raw value Traw of the eighth touch electrode TE8 is "12," the touch raw value Traw of the ninth touch electrode TE9 is "7," the touch raw value Traw of the tenth touch electrode TE10 is "75," the touch raw value Traw of the eleventh touch electrode TE11 is "99," the touch raw value Traw of the twelfth touch electrode TE12 is "47," the touch raw value Traw of the thirteenth touch electrode TE13 is "6," the touch raw value Traw of the fourteenth touch electrode TE14 is "35," the touch raw value Traw of the fifteenth touch electrode TE15 is "82," and the touch raw value Traw of the sixteenth touch electrode TE16 is "10." Here, the number of touch electrodes with a touch raw value Traw equal to or greater than "10" out of the plurality of touch electrodes is nine. For example, when a minimum reference value of the touch raw value Traw for determining whether a touch has occurred is "10," at least nine hatched touch electrodes TE6, TE7, TE8, TE10, TE11, TE12, TE14, TE15, and TE16 are touched with a finger in the example illustrated in FIG. 9.

Referring to FIG. 9, the touch display device 200 according to embodiments of the present disclosure can estimate and limit a range of the finger touch area FTA with a finger on the basis of the touch raw values Traw of the touch electrodes TE. That is, since the touch raw values Traw of the touch electrodes TE in the finger touch area FTA of a finger vary depending on the size of an area in which the finger overlaps the touch electrodes TE, the range of the finger touch area FTA can be expressed on the basis of the touch raw values Traw of the touch electrodes TE.

Referring to FIG. 9, since the touch raw value Traw of the eleventh touch electrode TE11 is the highest out of the hatched touch electrodes TE6, TE7, TE8, TE10, TE11, TE12, TE14, TE15, and TE16, the eleventh touch electrode TE11 can be estimated to have a high likelihood that it will be a touch electrode TE which is the center of the finger touch area FTA. At this time, since the center point of the finger touch area FTA may not match the center of the eleventh touch electrode TE11, the center point of the finger touch area FTA can be estimated to be a position on the eleventh touch electrode TE11 on the basis of the touch raw values Traw of the surrounding touch electrodes TE. Since the touch raw value Traw of the tenth touch electrode TE10 is "75" and the touch raw value Traw of the twelfth touch electrode TE12 is "47," the finger touch area FTA can be estimated to overlap the tenth touch electrode TE10 more than the twelfth touch electrode TE12. Since the touch raw value Traw of the sixth touch electrode TE6 is "33," the touch raw value Traw of the eighth touch electrode TE8 is "12," and the touch raw value Traw of the sixth touch electrode TE6 is greater, it is estimated that an overlap area of the finger touch area FTA with the sixth touch electrode TE6 is greater than an overlap area with the eighth touch electrode TE8. Accordingly, the finger touch area FTA can be expressed on the basis of the touch raw values Traw of the touch electrodes TE in this way. That is, the finger touch area FTA with a finger touch can be recognized and defined on the basis of the touch raw values Traw of the touch electrodes TE.

Figure 10:
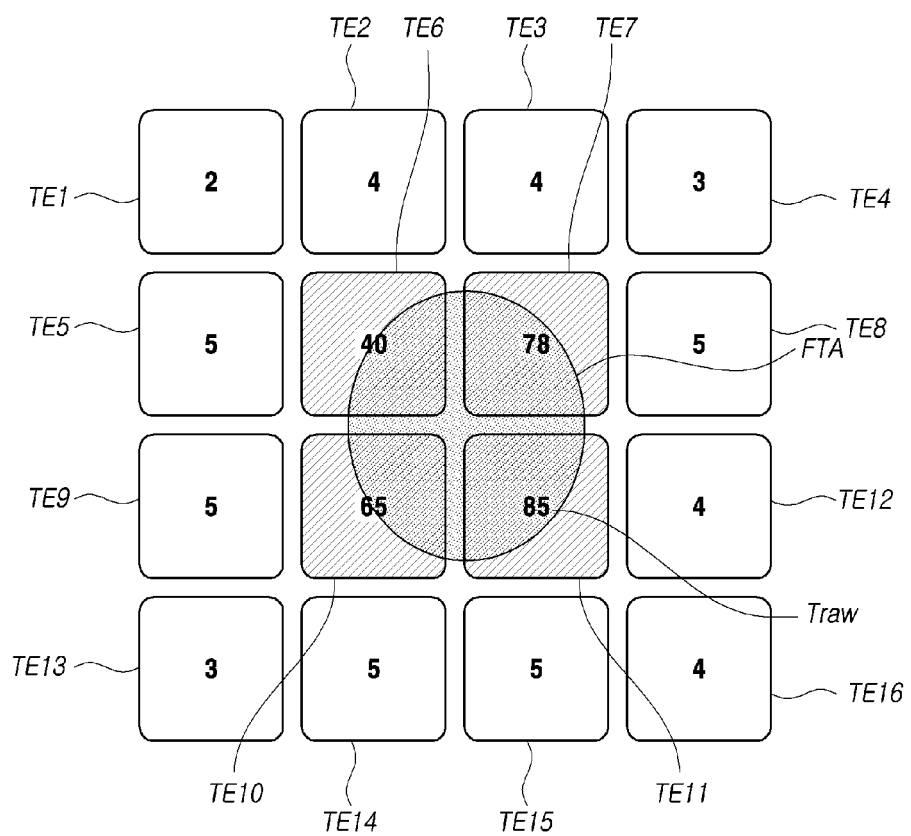
FIG. 10 is a diagram illustrating another example of touch electrodes in a display panel of the touch display device according to embodiments of the present disclosure which are touched with a finger.

FIG. 10 is a diagram illustrating another example of touch electrodes in the display panel DP of the touch display device 200 according to embodiments of the present disclosure which are touched with a finger. FIG. 10 is different from FIG. 9 in that the size of the finger touch area is less.

Referring to FIG. 10, the touch display device 200 according to embodiments of the present disclosure includes a plurality of touch electrodes TE1, TE2, TE3, TE4, TE5, TE6, TE7, TE8, TE9, TE10, TE11, TE12, TE13, TE14, TE15, and TE16.

Referring to FIG. 10, hatched touch electrodes TE6, TE7, TE10, and TE11 out of the plurality of touch electrodes TE1, TE2, TE3, TE4, TE5, TE6, TE7, TE8, TE9, TE10, TE11, TE12, TE13, TE14, TE15, and TE16 are touch electrodes TE which are touched with a finger and which exhibits a touch raw value Traw equal to or greater than a specific reference. The hatched touch electrodes TE6, TE7, TE10, and TE11 are touch electrodes TE which overlap at least a finger touch area FTA.

Referring to FIG. 10, the touch raw value Traw of the first touch electrode TE1 is "2," the touch raw value Traw of the second touch electrode TE2 is "4," the touch raw value Traw of the third touch electrode TE3 is "4," the touch raw value Traw of the fourth touch electrode TE4 is "3," the touch raw value Traw of the fifth touch electrode TE5 is "5," the touch raw value Traw of the sixth touch electrode TE6 is "40," the touch raw value Traw of the seventh touch electrode TE7 is "78," the touch raw value Traw of the eighth touch electrode TE8 is "5," the touch raw value Traw of the ninth touch electrode TE9 is "5," the touch raw value Traw of the tenth touch electrode TE10 is "65," the touch raw value Traw of the eleventh touch electrode TE11 is "85," the touch raw value Traw of the twelfth touch electrode TE12 is "4," the touch raw value Traw of the thirteenth touch electrode TE13 is "3," the touch raw value Traw of the fourteenth touch electrode TE14 is "5," the touch raw value Traw of the fifteenth touch electrode TE15 is "5," and the touch raw value Traw of the sixteenth touch electrode TE16 is "4." Here, the number of touch electrodes with a touch raw value Traw equal to or greater than "10" out of the plurality of touch electrodes is four. For example, when a minimum reference value of the touch raw value Traw for determining whether a touch has occurred is "10," at least nine hatched touch electrodes TE6, TE7, TE10, and TE11 are touched with a finger in the example illustrated in FIG. 10. In comparison with FIG. 9, the size of the finger touch area FTA in FIG. 10 is smaller than the finger touch area FTA in FIG. 9.

Referring to FIG. 10, the touch display device 200 according to embodiments of the present disclosure can estimate and limit a range of the finger touch area FTA with a finger on the basis of the touch raw values Traw of the touch electrodes TE. That is, since the touch raw values Traw of the touch electrodes TE in the finger touch area FTA of a finger vary depending on the size of an area in which the finger overlaps the touch electrodes TE, the range of the finger touch area FTA can be expressed on the absis of the touch raw values Traw of the touch electrodes TE.

Referring to FIG. 10, since the touch raw value Traw of the eleventh touch electrode TE11 is the highest out of the hatched touch electrodes TE6, TE7, TE10, and TE11, the eleventh touch electrode TE11 can be estimated to have a high likelihood that it will be a touch electrode TE which is the center of the finger touch area FTA. At this time, since the center point of the finger touch area FTA may not match the center of the eleventh touch electrode TE11, the center point of the finger touch area FTA can be estimated to be a position on the eleventh touch electrode TE11 on the basis of the touch raw values Traw of the surrounding touch electrodes TE. Since the touch raw value Traw of the sixth touch electrode TE6 is "40" and the touch raw value Traw of the seventh touch electrode TE7 is "78," the finger touch area FTA can be estimated to overlap the seventh touch electrode TE7 more than the sixth touch electrode TE6. Since the touch raw value Traw of the tenth touch electrode TE10 is "65," the touch raw value Traw of the eleventh touch electrode TE11 is "85," and the touch raw value Traw of the eleventh touch electrode TE11 is greater, it is estimated that an overlap area of the finger touch area FTA with the eleventh touch electrode TE11 is greater than an overlap area with the tenth touch electrode TE10. Accordingly, the finger touch area FTA can be expressed on the basis of the touch raw values Traw of the touch electrodes TE in this way. That is, the finger touch area FTA with a finger touch can be recognized and defined on the basis of the touch raw values Traw of the touch electrodes TE.

Figure 11:
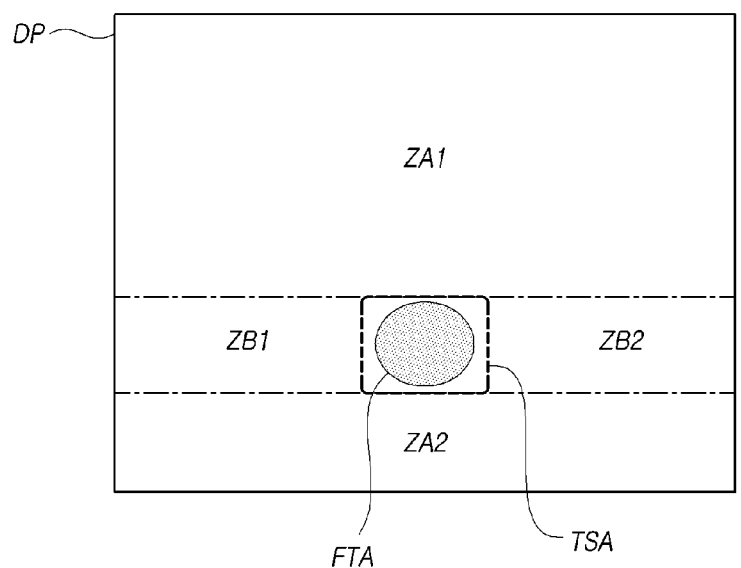
FIG. 11 is a diagram illustrating a finger touch area, a fingerprint sensing area, and a peripheral area in the display panel of the touch display device according to embodiments of the present disclosure.

FIG. 11 is a diagram illustrating a finger touch area FTA, a fingerprint sensing area TSA, and a peripheral area in the display panel DP of the touch display device 200 according to embodiments of the present disclosure.

Referring to FIG. 11, the touch display device 200 according to embodiments of the present disclosure includes a finger touch area FTA, a fingerprint sensing area TSA, a first display area ZA1, a second display area ZA2, a first peripheral area ZB1, and a second peripheral area ZB2.

Referring to FIG. 11, the finger touch area FTA of the touch display device 200 according to embodiments of the present disclosure is an area in which a touch between the display panel DP and a finger has occurred and can be defined as an area in which a finger has touched the display panel DP. Accordingly, the finger touch area FTA has a circular or elliptical shape.

The fingerprint sensing area TSA of the touch display device 200 according to embodiments of the present disclosure is set to be greater than or equal to the finger touch area FTA. The fingerprint sensing area TSA is an area for actually sensing a fingerprint and is set to the same area as the finger touch area FTA or is set to be wider than the finger touch area FTA. The fingerprint sensing area TSA can be set to be circular or elliptical similarly to the finger touch area FTA. The fingerprint sensing area TSA is set to be rectangular or polygonal unlike the finger touch area FTA. That is, the fingerprint sensing area TSA can be set to have various sizes and shapes according to necessity. For example, when the fingerprint sensing area TSA is set to have the same size or shape as the finger touch area FTA, only a necessary area can be accurately sensed and thus it is possible to save a time required for fingerprint sensing. For example, when it is difficult to accurately estimate the size and shape of the finger touch area FTA, the fingerprint sensing area TSA may be set to be larger than the finger touch area FTA to enhance fingerprint sensing accuracy.

The first display area ZA1 of the touch display device 200 according to embodiments of the present disclosure is defined as a partial area of the display panel DP which is located above the fingerprint sensing area TSA. For example, when the 101th to 112th gate lines GL of the display panel are gate lines GL corresponding to the fingerprint sensing area TSA, the first to 100th gate lines of the display panel DP can be defined as the gate lines GL corresponding to the first display area ZA1. The first display area ZA1 does not overlap the fingerprint sensing area TSA, the second display area ZA2, the first peripheral area ZB1, and the second peripheral area ZB2. Since the first display area ZA1 of the touch display device 200 according to embodiments of the present disclosure does not overlap the fingerprint sensing area TSA, an image can be displayed on the display panel even in the fingerprint sensing period FPP.

The second display area ZA2 of the touch display device 200 according to embodiments of the present disclosure is defined as a partial area of the display panel DP which is located below the fingerprint sensing area TSA. For example, when the 101th to 112th gate lines GL of the display panel DP are gate lines GL corresponding to the fingerprint sensing area TSA, the 113th to final gate lines GL of the display panel DP can be defined as the gate lines GL corresponding to the second display area ZA2. The second display area ZA2 does not overlap the fingerprint sensing area TSA, the first display area ZA1, the first peripheral area ZB1, and the second peripheral area ZB2. Since the second display area ZA2 of the touch display device 200 according to embodiments of the present disclosure does not overlap the fingerprint sensing area TSA, an image can be displayed on the display panel even in the fingerprint sensing period FPP.

The first peripheral area ZB1 of the touch display device 200 according to embodiments of the present disclosure is defined as a partial area of the display panel DP which is located on the left of the fingerprint sensing area TSA. For example, when the 101th to 112th data lines DL of the display panel DP are data lines DL corresponding to the fingerprint sensing area TSA, the first to 100th data lines DL of the display panel DP can be defined as the data lines DL corresponding to the first peripheral area ZB1. The gate lines GL corresponding to the first peripheral area ZB1 are set to the same gate lines GL as the gate lines GL corresponding to the fingerprint sensing area TSA. The first peripheral area ZB1 does not overlap the fingerprint sensing area TSA, the first display area ZA1, the second display area ZA2, and the second peripheral area ZB2. The touch display device 200 according to embodiments of the present disclosure can also display an image in the first peripheral area ZB1 even in the fingerprint sensing period FPP. In the fingerprint sensing period FPP of the display panel DP, at least a part of the first peripheral area ZB1 can be set to a different state for the purpose of fingerprint sensing. For example, at least a part of the data lines DL or the touch electrodes TE corresponding to the first peripheral area ZB1 can be set to a floating state in the fingerprint sensing period FPP. A noise reduction signal NRS can be supplied to at least a part of the data lines, the gate lines GL, or the touch electrodes corresponding to the first peripheral area ZB1 in the fingerprint sensing period FPP.

The second peripheral area ZB2 of the touch display device 200 according to embodiments of the present disclosure is defined as a partial area of the display panel DP which is located on the right of the fingerprint sensing area TSA. For example, when the 101th to 112th data lines DL of the display panel are data lines DL corresponding to the fingerprint sensing area TSA, the 113th to final data lines DL of the display panel DP can be defined as the data lines DL corresponding to the second peripheral area ZB2. The gate lines GL corresponding to the second peripheral area ZB2 are set to the same gate lines GL as the gate lines GL corresponding to the fingerprint sensing area TSA. The second peripheral area ZB2 does not overlap the fingerprint sensing area TSA, the first display area ZA1, the second display area ZA2, and the first peripheral area ZB1. The touch display device 200 according to embodiments of the present disclosure can also display an image in the second peripheral area ZB2 even in the fingerprint sensing period FPP. In the fingerprint sensing period FPP of the display panel DP, at least a part of the second peripheral area ZB2 can be set to a different state for the purpose of fingerprint sensing. For example, at least a part of the data lines DL or the touch electrodes TE corresponding to the second peripheral area ZB2 can be set to a floating state in the fingerprint sensing period FPP. A noise reduction signal NRS can be supplied to at least a part of the data lines, the gate lines GL, or the touch electrodes corresponding to the second peripheral area ZB2 in the fingerprint sensing period FPP.

Figure 12:
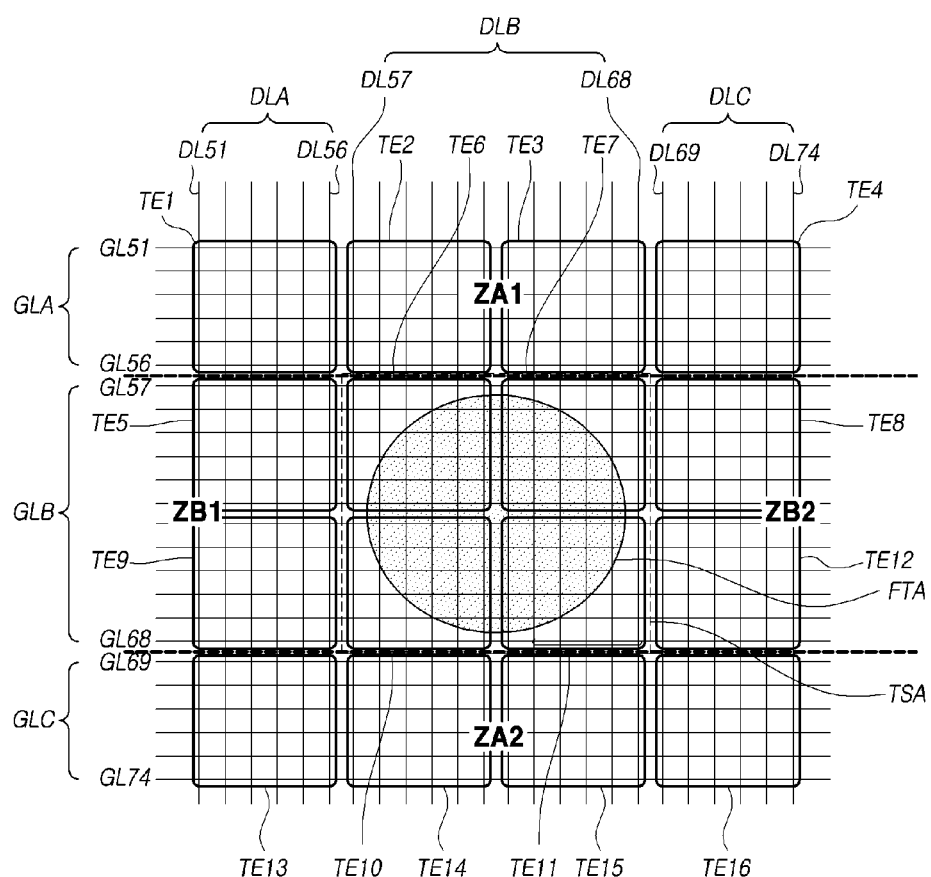
FIG. 12 is a diagram schematically illustrating parts of a first display area, a second display area, a first peripheral area, and a second peripheral area around a finger touch area and a fingerprint sensing area in the display panel of the touch display device according to embodiments of the present disclosure.

FIG. 12 is a diagram schematically illustrating parts of a first display area ZA1, a second display area ZA2, a first peripheral area ZB1, and a second peripheral area ZB2 around a finger touch area FTA and a fingerprint sensing area FSA in the display panel DP of the touch display device 200 according to embodiments of the present disclosure.

Referring to FIG. 12, the touch display device 200 according to embodiments of the present disclosure includes a plurality of data line groups DLA, DLB, and DLC, a plurality of gate line groups GLA, GLB, and GLC, and a plurality of touch electrodes TE1, TE2, TE3, TE4, TE5, TE6, TE7, TE8, TE9, TE10, TE11, TE12, TE13, TE14, TE15, and TE16. Referring to FIG. 12, the plurality of data line groups DLA, DLB, and DLC and the plurality of gate line groups GLA, GLB, and GLC are arranged to at least partially overlap areas corresponding to the plurality of touch electrodes TE1, TE2, TE3, TE4, TE5, TE6, TE7, TE8, TE9, TE10, TE11, TE12, TE13, TE14, TE15, and TE16.

Referring to FIG. 12, the 51th to 56th gate lines GL51 to GL56 corresponding to the A-th gate line group GLA out of the plurality of gate line groups GLA, GLB, and GLC of the touch display device 200 according to embodiments of the present disclosure are arranged to overlap the first to fourth touch electrodes TE1 to TE4 in a partial area of the first display area ZA1. The 51th to 56th gate lines GL51 to GL56 are arranged to overlap the plurality of data line groups DLA, DLB, and DLC.

The 57th to 68th gate lines GL57 to GL68 corresponding to the B-th gate line group GLB out of the plurality of gate line groups GLA, GLB, and GLC of the touch display device 200 according to embodiments of the present disclosure are arranged to overlap the sixth to twelfth touch electrodes TE6 to TE12 in a partial area of the first peripheral area ZB1, a partial area of the second peripheral area ZB2, and a partial area of the fingerprint sensing area TSA. The 57th to 68th gate lines GL57 to GL68 are arranged to overlap the plurality of data line groups DLA, DLB, and DLC.

The 69th to 74th gate lines GL69 to GL74 corresponding to the C-th gate line group GLC out of the plurality of gate line groups GLA, GLB, and GLC of the touch display device 200 according to embodiments of the present disclosure are arranged to overlap the thirteenth to sixteenth touch electrodes TE13 to TE16 in a partial area of the second display area ZA2. The 69th to 74th gate lines GL69 to GL74 are arranged to overlap the plurality of data line groups DLA, DLB, and DLC.

Referring to FIG. 12, the 51th to 56th data lines DL51 to DL56 corresponding to the A-th data line group DLA out of the plurality of data line groups DLA, DLB, and DLC of the touch display device 200 according to embodiments of the present disclosure are arranged to overlap the first touch electrode TE1, the fifth touch electrode TE5, the ninth touch electrode TE9, and the thirteenth touch electrode TE13 in a partial area of the first display area ZA1, a partial area of the first peripheral area ZB1, and a partial area of the second display area ZA2. The 51th to 56th data lines DL51 to DL56 are arranged to overlap the plurality of gate line groups GLA, GLB, and GLC.

The 57th to 68th data lines DL57 to DL68 corresponding to the B-th data line group DLB out of the plurality of data line groups DLA, DLB, and DLC of the touch display device 200 according to embodiments of the present disclosure are arranged to overlap the second touch electrode TE2, the third touch electrode TE3, the sixth touch electrode TE6, the seventh touch electrode TE7, the tenth touch electrode TE10, the eleventh touch electrode TE11, the fourteenth touch electrode TE14, and the fifteenth touch electrode TE15 in a partial area of the first display area ZA1, a partial area of the fingerprint sensing area TSA, and a partial area of the second display area ZA2. The 57th to 68th data lines DL57 to DL68 are arranged to overlap the plurality of gate line groups GLA, GLB, and GLC.

The 69th to 74th data lines DL69 to DL74 corresponding to the C-th data line group DLC out of the plurality of data line groups DLA, DLB, and DLC of the touch display device 200 according to embodiments of the present disclosure are arranged to overlap the fourth touch electrode TE4, the eighth touch electrode TE8, the twelfth touch electrode TE12, and the sixteenth touch electrode TE16 in a partial area of the first display area ZA1, a partial area of the second peripheral area ZB2, and a partial area of the second display area ZA2. The 69th to 74th data lines DL69 to DL74 are arranged to overlap the plurality of gate line groups GLA, GLB, and GLC.

Referring to FIG. 12, when a finger touches the display panel DP, the touch display device 200 according to embodiments of the present disclosure recognizes the finger touch area FTA and specifies the fingerprint sensing area TSA on the basis of the finger touch area FTA. That is, the touch display device 200 according to embodiments of the present disclosure senses the touch electrodes TE arranged in the display panel DP, recognizes the finger touch area FTA, and sets the fingerprint sensing area TSA requiring fingerprint sensing on the basis of the finger touch area FTA. When the fingerprint sensing area TSA is set, a fingerprint can be sensed in the corresponding area using the plurality of gate lines GL and the plurality of data lines DL. Referring to FIG. 12, the 57th to 68th data lines DL57 to DL68 corresponding to the B-th data line group DLB and the 57th to 68th gate lines GL57 to GL68 corresponding to the B-th gate line group GLB which correspond to the fingerprint sensing area TSA are driven and a fingerprint in the corresponding area can be sensed by sensing the pixel electrodes PX of the corresponding area.

Since there can be an area not required for fingerprint sensing in the peripheral area of the finger touch area FTA, the fingerprint sensing area TSA can be appropriately set according to necessity when the touch display device 200 according to embodiments of the present disclosure senses the fingerprint sensing area TSA.

Referring to FIG. 12, the fingerprint sensing area TSA of the touch display device 200 according to embodiments of the present disclosure is set to be larger than the finger touch area FTA. The finger touch area FTA is set to be elliptical and the fingerprint sensing area TSA is set to be rectangular. In FIG. 12, the fingerprint sensing area TSA is set to an area which is larger than the finger touch area FTA, but the fingerprint sensing area TSA of the touch display device 200 according to embodiments of the present disclosure can be set to the same size and shape as the finger touch area FTA.

The number of pixel electrodes PX corresponding to the fingerprint sensing area TSA and a time required for sensing in the touch display device 200 according to embodiments of the present disclosure will be described below. It is assumed that the number of pixel electrodes PX corresponding to one touch electrode TE is 1296 (=36×36) including 36 in width and 36 in length. For example, when the touch electrodes TE corresponding to the finger touch area FTA include three touch electrodes in width and three touch electrodes in length, the total number of touch electrodes TE is 3×3=9. When the number of touch electrodes TE corresponding to the fingerprint sensing area TSA is 9, the number of pixel electrodes PX corresponding to the fingerprint sensing area TSA is 11,664 in total. Accordingly, 11,664 pixel electrodes PX have to be sensed for sensing a fingerprint. When all the pixel electrodes PX corresponding to the fingerprint sensing area TSA have to be sensed, 108 pixel electrodes PX in width and 108 pixel electrodes PX in length have to be sensed. When it is assumed that the number of touch sensors Sensor included in the touch driver STIC is 108, the number of pixel electrodes PX which can be simultaneously sensed is 108. Accordingly, in a method of sensing 108×108 pixel electrodes PX using the touch driver STIC including 108 touch sensors, 108 pixel electrodes PX which are pixel electrodes PX associated with one gate line GL can be simultaneously sensed using 108 touch sensors Sensor, and all of 11,664 pixel electrodes PX can be sensed by sequentially sensing 108 pixel electrodes PX 108 times in this way. That is, when a driving transistor turn-on voltage is sequentially supplied to the gate lines GL corresponding to the fingerprint sensing area TSA and a fingerprint driving signal FDS is supplied to the data lines DL corresponding to the fingerprint sensing area TSA to sense a fingerprint in 108 horizontal periods H of the touch display device 200, all the 11,664 pixel electrodes PX corresponding to the fingerprint sensing area TSA can be sensed in one frame period Frame.

The touch display device 200 according to embodiments of the present disclosure can appropriately change the pixel electrodes PX which are actually sensed out of the pixel electrodes PX corresponding to the fingerprint sensing area TSA depending on the situation. That is, the touch display device 200 according to embodiments of the present disclosure can sense none of the pixel electrodes PX corresponding to the fingerprint sensing area TSA. That is, only the pixel electrodes PX in a necessary area can be sensed. For example, when a fingerprint sensing time of the touch display device 200 is not sufficient or all the pixel electrodes PX in the fingerprint sensing area TSA do not need to be sensed, a half of the pixel electrodes PX or a necessary number of pixel electrodes PX can be sensed. At this time, the pixel electrodes PX to be sensed can be set using various methods according to necessity. For example, only the odd-numbered pixel electrodes PX or the even-numbered pixel electrodes PX can be sensed. For example, only the odd-numbered pixel electrodes PX can be sensed in a first frame period and only the even-numbered pixel electrodes PX can be sensed in a second frame period. For example, the fingerprint sensing area TSA can be divided into a "central part" and a "peripheral part," all the pixel electrodes PX corresponding to the "central part can be sensed, and the pixel electrodes PX corresponding to the "peripheral part" can be sensed in only a necessary area.

In the touch display device 200 according to embodiments of the present disclosure, when the first horizontal period 1H is not sufficient for a time for supplying a fingerprint driving signal FDS to the data lines DL corresponding to the fingerprint sensing area TSA, the fingerprint driving signal FDS can be supplied to the data lines DL corresponding to the fingerprint sensing area TSA to perform fingerprint sensing in a period in which the gate lines GL corresponding to the fingerprint sensing area TSA are driven out of a plurality of frame periods of the touch display device 200. For example, in a driving period of 10 frames, the fingerprint driving signal FDS can be supplied to the data lines DL corresponding to the fingerprint sensing area TSA to perform fingerprint sensing in the period in which the gate lines GL corresponding to the fingerprint sensing area TSA are driven for each frame.

In the touch display device 200 according to embodiments of the present disclosure, when the first horizontal period 1H is not sufficient for the time for supplying the fingerprint driving signal FDS to the data lines DL corresponding to the fingerprint sensing area TSA, the gate lines GL corresponding to the fingerprint sensing area TSA are driven and the fingerprint driving signal FDS is supplied to the data lines DL corresponding to the fingerprint sensing area TSA to perform fingerprint sensing in a time (1H+Ta) longer than the first horizontal period 1H in a period in which the gate lines GL corresponding to the fingerprint sensing area TSA are driven. For example, in a time (3H) which is three times longer than the first horizontal period 1H, the gate lines GL corresponding to the fingerprint sensing area TSA can be driven and the fingerprint driving signal FDS can be supplied to the data lines DL corresponding to the fingerprint sensing area TSA to perform fingerprint sensing.

Figure 13:
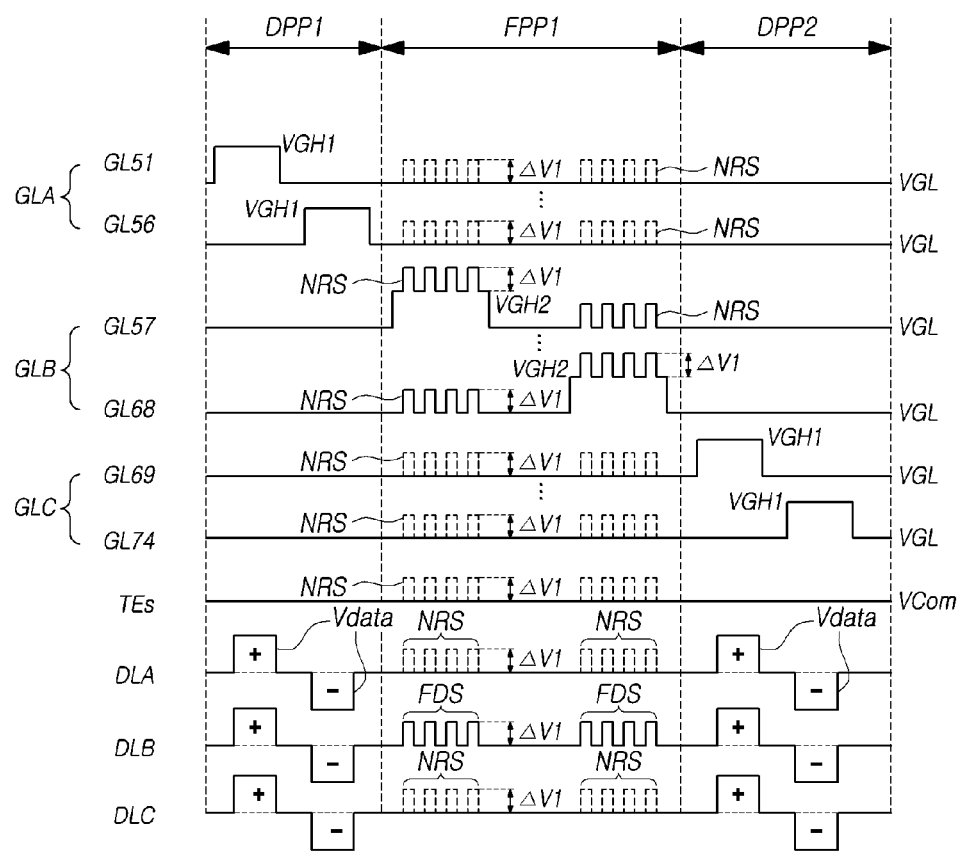
FIG. 13 is a diagram schematically illustrating driving of gate line groups, data line groups, and touch electrodes corresponding to the first display area, the second display area, the first peripheral area, and the second peripheral area in the display panel of the touch display device according to embodiments of the present disclosure.

FIG. 13 is a diagram schematically illustrating driving of the gate line groups GLA, GLB, and GLC, the data line groups DLA, DLB, and DLC, and the touch electrodes TE corresponding to the fingerprint sensing area TSA, the first display area ZA1, the second display area ZA2, the first peripheral area ZB1, and the second peripheral area ZB2 on the display panel DP according to embodiments of the present disclosure. FIG. 13 is a diagram illustrating a part of a period associated with driving of the "step of sensing a fingerprint in the corresponding area" in FIG. 8 in the touch display device 200 according to embodiments of the present disclosure. That is, FIG. 13 is a diagram schematically illustrating driving of the gate line groups GLA, GLB, and GLC, the data line groups DLA, DLB, and DLC, and the touch electrodes TE in a fingerprint area sensing period and before and after the fingerprint area sensing period after a finger touch has been recognized and the fingerprint sensing area TSA has been specified.

In FIG. 13, driving signals which are supplied to the gate line groups GLA, GLB, and GLC, the data line groups DLA, DLB, and DLC, and the touch electrodes TE corresponding to the fingerprint sensing area TSA, the first display area ZA1, the second display area ZA2, the first peripheral area ZB1, and the second peripheral area ZB2 in a first display period DPP1, a first fingerprint sensing period FPP1, and a second display period DPP2 of the display panel DP of the touch display device 200 according to embodiments of the present disclosure are illustrated.

Referring to FIG. 13, in the first display period DPP1 of the display panel DP, a first gate driving voltage VGH1 is sequentially supplied to the 51th to 56th gate lines GL51 to GL56 corresponding to the A-th gate line group GLA, a common voltage Vcom is supplied to the touch electrodes TE corresponding to a part of the first display area ZA1, and a data voltage Vdata is supplied to an area corresponding to at least the plurality of data line groups DLA, DLB, and DLC. By this driving, display image data Vdata corresponding to the corresponding area can be updated in at least a part of the first display area ZA1 of the display panel DP and the corresponding image can be displayed on the display panel DP. At this time, the image data Vdata can be supplied to the area corresponding to the other data lines DL corresponding to the first display area ZA1 as well as the plurality of data line groups DLA, DLB, and DLC. The supplied image data can be driven in an inversion manner while the polarity of the image data Vdata is alternately inverted between "+" and "−" according to a predetermined criterion.

Referring to FIG. 13, in the second display period DPP2 of the display panel DP, a first gate driving voltage VGH1 is sequentially supplied to the 69th to 74th gate lines GL69 to GL74 corresponding to the C-th gate line group GLC, a common voltage Vcom is supplied to the touch electrodes TE corresponding to a part of the second display area ZA2, and a data voltage Vdata is supplied to an area corresponding to at least the plurality of data line groups DLA, DLB, and DLC. By this driving, display image data Vdata corresponding to the corresponding area can be updated in at least a part of the second display area ZA2 of the display panel DP and the corresponding image can be displayed on the display panel DP. At this time, the image data Vdata can be supplied to the area corresponding to the other data lines DL corresponding to the second display area ZA2 as well as the plurality of data line groups DLA, DLB, and DLC. The supplied image data can be driven in an inversion manner while the polarity of the image data Vdata is alternately inverted between "+" and "−" according to a predetermined criterion.

Referring to FIG. 13, in the first fingerprint sensing period FPP1 of the display panel DP, a second gate driving voltage VGH2 is sequentially supplied to the 57th to 68th gate lines GL57 to GL68 corresponding to the B-th gate line group GLB, a fingerprint driving signal FDS is supplied to the 57th to 68th data lines DL57 to DL68 corresponding to the B-th data line group DLB, and the corresponding pixel electrodes PX are sensed. At this time, a voltage difference of the fingerprint driving signal FDS is set to AV1. Since the touch display device 200 according to embodiments of the present disclosure senses a fingerprint by sensing a capacitance corresponding to the pixel electrodes PX using a plurality of data lines DL, a turn-on voltage of a driving transistor can be supplied to the corresponding gate lines GL at the time of sensing the corresponding pixel electrodes PX. The touch display device 200 according to embodiments of the present disclosure supplies the second gate voltage VGH2 which is higher than the first gate voltage VGH1 for display driving to the gate lines GL to decrease a turn-on resistance of the driving transistor, and thus it is possible to enhance accuracy of fingerprint sensing.

Referring to FIG. 13, in the first fingerprint sensing period FPP1 of the display panel DP, the touch display device 200 according to embodiments of the present disclosure can supply a noise reduction signal NRS to electrodes arranged around the pixel electrodes PX to be sensed in order to reduce noise at the time of sensing a fingerprint.

Referring to FIG. 13, in the first fingerprint sensing period FPP1 of the display panel DP, the noise reduction signal NRS is supplied to at least one gate line GL out of the 51th to 56th gate lines GL51 to GL56 corresponding to the A-th gate line group GLA. At this time, the noise reduction signal NRS has the same phase or the same voltage difference AV1 as the fingerprint driving signal FDS. The noise reduction signal NRS which is supplied to the gate lines GL associated with the pixel electrodes PX which are not sensed is set to have a voltage level close to a gate low voltage VGL which is lower than the turn-on voltage of a driving transistor. For example, when the fingerprint driving signal FDS is a signal which swings from 1 V to 5 V and the gate low voltage VGL is −20 V, the noise reduction signal NRS is a signal which swings from −20V to −16V.

Referring to FIG. 13, in the first fingerprint sensing period FPP1 of the display panel DP, the noise reduction signal NRS is supplied to at least one gate line GL out of the 69th to 74th gate lines GL69 to GL74 corresponding to the C-th gate line group GLC. At this time, the noise reduction signal NRS has the same phase or the same voltage difference AV1 as the fingerprint driving signal FDS. The noise reduction signal NRS which is supplied to the gate lines GL associated with the pixel electrodes PX which are not sensed is set to have a voltage level close to a gate low voltage VGL which is lower than the turn-on voltage of a driving transistor. For example, when the fingerprint driving signal FDS is a signal which swings from 1 V to 5 V and the gate low voltage VGL is −20 V, the noise reduction signal NRS is a signal which swings from −20V to −16V.

Referring to FIG. 13, in the first fingerprint sensing period FPP1 of the display panel DP, the noise reduction signal NRS is supplied to at least one gate line GL out of the 57th to 68th gate lines GL57 to GL68 corresponding to the B-th gate line group GLB. At this time, the noise reduction signal NRS has the same phase or the same voltage difference AV1 as the fingerprint driving signal FDS. The noise reduction signal NRS which is supplied to the gate lines GL associated with the pixel electrodes PX which are not sensed is set to have a voltage level close to a gate low voltage VGL which is lower than the turn-on voltage of a driving transistor. The noise reduction signal NRS which is supplied to the gate lines GL associated with the pixel electrodes PX which are sensed is set to have a voltage level which is higher than the turn-on voltage of a driving transistor. For example, when the fingerprint driving signal FDS is supplied to the data lines DL corresponding to the B-th data line group DLB after the second gate driving voltage VGH2 has been supplied to the 57th gate line GL57, the second gate driving voltage VGH2 is set to a voltage obtained by adding the noise reduction signal NRS to the original second gate driving voltage VGH2 and this set voltage is supplied. When the fingerprint driving signal FDS is supplied to the data lines DL corresponding to the B-th data line group DLB after the second gate driving voltage VGH2 has been supplied to the 68th gate line GL68, the second gate driving voltage VGH2 is set to a voltage obtained by adding the noise reduction signal NRS to the original second gate driving voltage VGH2 and this set voltage is supplied.

Referring to FIG. 13, in the first fingerprint sensing period FPP1 of the display panel DP, a noise reduction signal NRS is supplied to a plurality of touch electrodes TE6, TE7, TE10, and TE11 corresponding to the fingerprint sensing area TSA. The noise reduction signal NRS is supplied to only the touch electrodes TE corresponding to the pixel electrodes PX in which fingerprint sensing is performed. In some cases, in the first fingerprint sensing period FPP1 of the display panel DP, the noise reduction signal NRS is supplied to all the touch electrodes TE6, TE7, TE10, and TE11 in the area corresponding to the entire fingerprint sensing area TSA in order to reduce noise. At this time, the noise reduction signal NRS is the same signal as the noise reduction signal NRS which is supplied to the data lines DL.

In the touch display device 200 according to embodiments of the present disclosure, in the first fingerprint sensing period FPP1, a data voltage Vdata is supplied to the data lines DL arranged in the entire area of the first peripheral area ZB1 or at least a partial area of the first peripheral area ZB1, a common voltage Vcom is supplied to the touch electrodes TE to update display image data Vdata in the corresponding area, and the image is displayed in the corresponding area. In the touch display device 200 according to embodiments of the present disclosure, in the first fingerprint sensing period FPP1, the data voltage Vdata is supplied to the data lines DL arranged in the entire area of the second peripheral area ZB2 or at least a partial area of the second peripheral area ZB2, the common voltage Vcom is supplied to the touch electrodes TE to update display image data Vdata in the corresponding area, and the image is displayed in the corresponding area.

In the touch display device 200 according to embodiments of the present disclosure, in the first fingerprint sensing period FPP1, the data lines DL arranged in the entire area of the first peripheral area ZB1 or at least a partial area of the first peripheral area ZB1 are maintained in a floating state or are supplied with the noise reduction signal NRS to reduce noise which can affect fingerprint sensing. In the touch display device 200 according to embodiments of the present disclosure, in the first fingerprint sensing period FPP1, the data lines DL arranged in the entire area of the second peripheral area ZB2 or at least a partial area of the second peripheral area ZB2 are maintained in a floating state or are supplied with the noise reduction signal NRS to reduce noise which can affect fingerprint sensing.

The touch display device 200 according to embodiments of the present disclosure performs the step of preparing for sensing a fingerprint before supplying a fingerprint driving signal FDS to the data lines corresponding to the fingerprint sensing area TSA. For example, when a current frame is a frame in which a fingerprint is sensed, the preparing for sensing a fingerprint can be performed in a period previous to the current frame. The preparing for sensing a fingerprint can be performed in the current frame. For example, the preparing for sensing a fingerprint can be performed immediately before the fingerprint driving signal FDS is supplied in the first fingerprint sensing period FPP1. Alternatively, the preparing for sensing a fingerprint can be performed between the previous frame and the current frame. In a period in which the preparing for sensing a fingerprint is performed, a predetermined pattern (a black, white, or specific pattern image) or a predetermined image is displayed in the corresponding area, or a predetermined voltage or signal is supplied to the data lines DL, the gate lines GL, or the touch electrodes. The period in which the preparing for sensing a fingerprint is performed can be considered as a step of initializing the corresponding area in advance in sensing a fingerprint.

Figure 14:
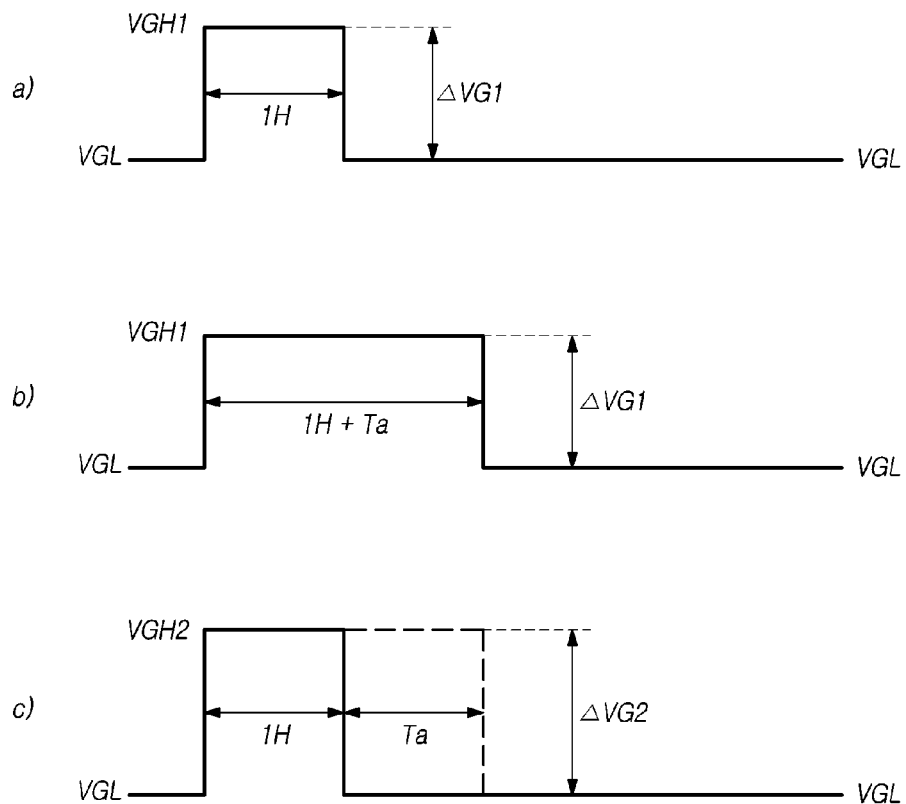
FIG. 14 is a diagram illustrating signals which are applied to gate lines arranged in the display panel of the touch display device according to embodiments of the present disclosure.

FIG. 14 is a diagram illustrating signals which are supplied to the gate lines GL arranged in the display panel DP of the touch display device 200 according to embodiments of the present disclosure.

Referring to (a) of FIG. 14, the touch display device 200 according to embodiments of the present disclosure sequentially supplies a turn-on voltage of a driving transistor to the gate lines GL corresponding to the display image update area in order to display an image on the display panel DP. Before the turn-on voltage of a driving transistor is supplied to the gate lines GL corresponding to the display image update area, a gate low voltage VGL is supplied to keep the driving transistor turned off. When the gate lines GL corresponding to the display image update area are driven, a first gate driving voltage VGH1 corresponding to the turn-on voltage of a driving transistor TFT is supplied to the gate lines GL in the first horizontal period 1H. At this time, a voltage difference between the level of the gate low voltage VGL and the level of the first gate driving voltage VGH1 is set to AVG1. After the first gate driving voltage VGH1 has been supplied to the gate lines GL corresponding to the display image update area, the gate low voltage VGL is supplied again to keep the driving transistor turned off again.

Referring to (b) of FIG. 14, the touch display device 200 according to embodiments of the present disclosure sequentially supplies a turn-on voltage of a driving transistor to the gate lines GL corresponding to the fingerprint sensing area TSA in order to sense a fingerprint on the display panel DP. Before the turn-on voltage of a driving transistor is supplied to the gate lines GL corresponding to the fingerprint sensing area TSA, a gate low voltage VGL is supplied to keep the driving transistor turned off. The time in which the first gate voltage corresponding to the turn-on voltage of a driving transistor is supplied to the gate lines GL corresponding to the fingerprint sensing area TSA, can be a time (1H+Ta) which is longer than the first horizontal period 1H. In this case, a particularly gate control signal for controlling the time in which the first gate voltage VGH1 is supplied to the gate lines GL corresponding to the fingerprint sensing area TSA is necessary. At this time, a voltage difference between the level of the gate low voltage VGL and the level of the first gate driving voltage VGH1 is set to AVG1. After the first gate driving voltage VGH1 has been supplied to the gate lines GL corresponding to the fingerprint sensing area TSA, the gate low voltage VGL is supplied again to keep the driving transistor turned off again. Since the touch display device 200 according to embodiments of the present disclosure senses a change in capacitance generated in the pixel electrodes PX via the data lines DL, the driving transistor has to be kept turned on in the time in which fingerprint sensing is actually performed in the fingerprint sensing period FPP. At this time, by setting the time in which the first gate driving voltage VGH1 is supplied to the gate lines GL corresponding to the fingerprint sensing area TSA to the time (1H+Ta) which is longer than the first horizontal period 1H, it is possible to satisfactorily secure a fingerprint sensing time for sensing the change in capacitance generated in the pixel electrodes PX and to enhance accuracy of fingerprint sensing.

Referring to (c) of FIG. 14, the touch display device 200 according to embodiments of the present disclosure sequentially supplies a turn-on voltage of a driving transistor to the gate lines GL corresponding to the fingerprint sensing area TSA in order to sense a fingerprint on the display panel DP. Before the turn-on voltage of a driving transistor is supplied to the gate lines GL corresponding to the fingerprint sensing area TSA, a gate low voltage VGL is supplied to keep the driving transistor turned off. In the first horizontal period 1H, a second gate driving voltage VGH2 corresponding to a turn-on voltage of a driving transistor TFT is supplied to the gate lines GL corresponding to the fingerprint sensing area TSA. In a time (1H+Ta) which is longer than the first horizontal period 1H, the second gate voltage VGH2 corresponding to the turn-on voltage of the driving transistor TFT is supplied to the gate lines GL corresponding to the fingerprint sensing area TSA. In this case, a particularly gate control signal for controlling the time in which the second gate voltage VGH2 is supplied to the gate lines GL corresponding to the fingerprint sensing area TSA is necessary. At this time, a voltage difference between the level of the gate low voltage VGL and the level of the second gate driving voltage VGH2 is set to AVG2. After the second gate driving voltage VGH2 has been supplied to the gate lines GL corresponding to the fingerprint sensing area TSA, the gate low voltage VGL is supplied again to keep the driving transistor turned off again. Since the touch display device 200 according to embodiments of the present disclosure senses a change in capacitance generated in the pixel electrodes PX via the data lines DL, the driving transistor has to be kept turned on in the time in which fingerprint sensing is actually performed in the fingerprint sensing period FPP. At this time, the second gate driving voltage VGH2 supplied to the gate lines GL corresponding to the fingerprint sensing area TSA is set to a voltage higher than the first gate driving voltage VGH1. Accordingly, it is possible to decrease a turn-on resistance of the driving transistor and to stably perform fingerprint sensing.

Figure 15:
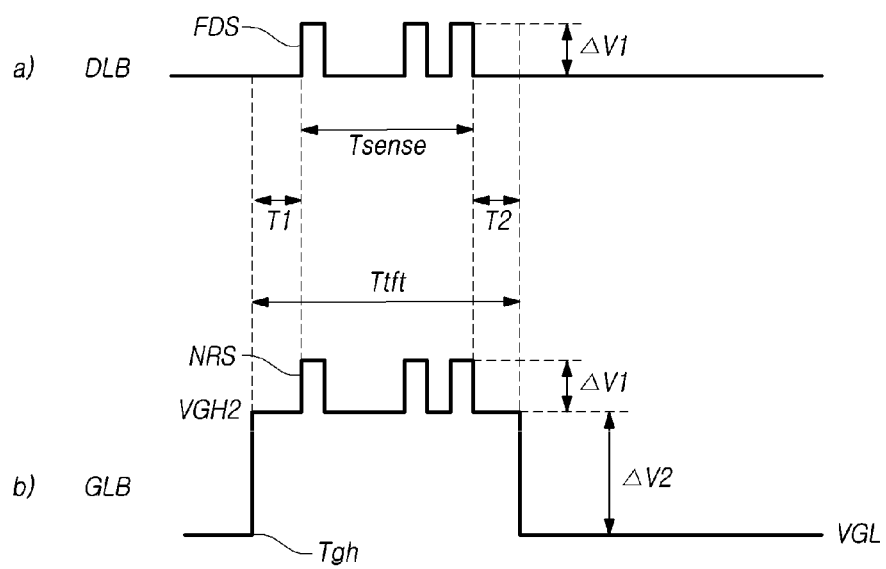
FIG. 15 is a diagram schematically illustrating parts of a signal which is supplied to data lines of a B-th data line group and a signal which is supplied to gate lines of a B-th gate line group in FIG. 13 in a first fingerprint sensing period of the touch display device according to embodiments of the present disclosure.

FIG. 15 is a diagram schematically illustrating parts of a signal which is supplied to the data lines DL of the B-th data line group and a signal which is supplied to the gate lines GL of the B-th gate line group in FIG. 13 in a first fingerprint sensing period FPP1 of the touch display device 200 according to embodiments of the present disclosure.

Referring to (a) of FIG. 15, in a fingerprint sensing time Tsense in the first fingerprint sensing period FPP1 of the touch display device 200 according to embodiments of the present disclosure, a fingerprint driving signal FDS is supplied to the data lines DL corresponding to the B-th data line group DLB on the display panel DP. The fingerprint driving signal FDS supplied to the data lines DL corresponding to the fingerprint sensing area TSA can be a signal in the form of one or more pulses. The fingerprint driving signal FDS can be a signal in the form of square waves. The fingerprint driving signal FDS can be a signal in the form of triangular waves, trapezoid waves, or sine waves.

When the fingerprint driving signal FDS of the touch display device 200 according to embodiments of the present disclosure is supplied in the form of two or more pulses, the first to n-th pulses can be dummy pulses (where n is a natural number). The dummy pulses refer to pulses which are not used for fingerprint sensing. For example, the first pulse can be a setting pulse to help stabilization of the pixel electrodes PX for sensing a fingerprint. The second pulse can be a reset pulse to serve as a signal for informing that the pulses subsequent to the reset pulse are used for actually sensing a fingerprint.

Referring to (b) of FIG. 15, in the first fingerprint sensing period FPP1 of the touch display device 200 according to embodiments of the present disclosure, a second gate voltage VGH2 is sequentially supplied to the gate lines GL corresponding to the B-th gate line group GLB on the display panel DP. However, the second gate voltage VGH2 can be supplied to the gate lines GL corresponding to the B-th gate line group GLB randomly or in a predetermined order depending on the method of sensing a fingerprint.

Referring to FIG. 15, in a driving transistor turn-on time Ttft for sensing a fingerprint, the second gate voltage VGH2 is supplied to the gate lines GL corresponding to the B-th gate line group GLB. At this time, the driving transistor turn-on time Ttft can be a time which is equal to or longer than one horizontal period 1H. In the touch display device 200 according to embodiments of the present disclosure, when a first delay time T1 has elapsed after the time point at which the second gate voltage VGH2 is supplied to the gate lines GL corresponding to the B-th gate line group GLB, the fingerprint driving signal FDS is supplied to the B-th data line group DLB. This is because a certain time is required until the driving transistor is completely turned on after the second gate voltage VGH2 has been supplied to the gate lines GL corresponding to the B fingerprint sensing area TSA. This is also because a certain time is required for stably perform sensing a fingerprint. The touch display device 200 according to embodiments of the present disclosure supplies a gate low voltage VGL to the corresponding gate lines GL when a second delay time T2 has elapsed after the fingerprint driving signal FDS has been supplied to the data lines DL corresponding to the B-th data line group DLB. This is because a certain time is required until the display panel DP is stabilized after the noise reduction signal NRS and the noise reduction signal NRS have been supplied.

Referring to FIG. 15, in the driving transistor turn-on time Ttft for sensing a fingerprint, the second gate voltage VGH2 and the noise reduction signal NRS are supplied to the gate lines GL corresponding to the B-th gate line group GLB. The noise reduction signal NRS supplied to the gate lines GL corresponding to the B-th gate line group GLB has the same phase, the same voltage difference, or the same frequency as the fingerprint driving signal FDS. For example, when the fingerprint driving signal FDS is a signal which swings from 1 V to 5 V and the second gate voltage VGH2 is 25 V, the noise reduction signal NRS supplied to the gate lines GL corresponding to the B-th gate line group GLB can be a signal which swings from 25 V to 29 V. However, the noise reduction signal NRS does not have to have the same phase, the same voltage difference, or the same frequency as the fingerprint driving signal FDS. In order to reduce noise, the noise reduction signal NRS can be set to have a phase, a voltage difference, or a frequency which is similar to the fingerprint driving signal FDS and then be supplied.

The above description and the appended claims represent an example of the technical idea of the present invention, and are to enable any person skilled in the art to make various modifications or corrections such as coupling, decoupling, substitutions, and changes of elements without departing from the gist of the present invention. The disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
 a display panel that includes a plurality of data lines, a plurality of gate lines, and a plurality of pixel electrodes which are arranged in areas adjacent to points at which the data lines and the gate lines cross each other, the display panel including a display image update area and a fingerprint sensing area;
 a gate driver configured to supply a first gate driving voltage to the gate lines corresponding to the display image update area out of the plurality of gate lines in a display period of the display panel, and to supply a second gate driving voltage to the gate lines corresponding to the fingerprint sensing area out of the plurality of gate lines in a fingerprint sensing period of the display panel; and
 a touch driver configured to supply a data voltage to the data lines corresponding to the display image update area out of the plurality of data lines in the display period of the display panel, and to supply a fingerprint driving signal to the data lines corresponding to the fingerprint sensing area out of the plurality of data lines in the fingerprint sensing period of the display panel,
 wherein the second gate driving voltage supplied to the gate lines corresponding to the fingerprint sensing area in the fingerprint sensing period of the display panel is higher than the first gate driving voltage supplied to the gate lines corresponding to the display image update area in the display period of the display panel, or
 wherein a time in which the second gate driving voltage is supplied to the gate lines corresponding to the fingerprint sensing area in the fingerprint sensing period of the display panel is longer than a time in which the first gate driving voltage is supplied to the gate lines corresponding to the display image update area in the display period of the display panel.

2. The touch display device according to claim 1, wherein the second gate driving voltage supplied to the gate lines corresponding to the fingerprint sensing area in the fingerprint sensing period of the display panel is a voltage having a noise reduction signal added thereto.

3. The touch display device according to claim 1, wherein a noise reduction signal is supplied to the gate lines around the gate lines corresponding to the pixel electrodes which are sensed out of the gate lines corresponding to the fingerprint sensing area in the fingerprint sensing period of the display panel.

4. The touch display device according to claim 1, wherein the gate lines around the gate lines corresponding to the pixel electrodes which are sensed out of the gate lines corresponding to the fingerprint sensing area in the fingerprint sensing period of the display panel are maintained in a floating state.

5. The touch display device according to claim 1, wherein a noise reduction signal is supplied to the data lines which are arranged around the fingerprint sensing area in the fingerprint sensing period of the display panel.

6. The touch display device according to claim 1, wherein the data lines which are arranged around the fingerprint sensing area are updated in display image or maintained in a floating state in the fingerprint sensing period of the display panel.

7. The touch display device according to claim 1, wherein the display panel further includes a plurality of touch electrodes and a plurality of touch lines, and
a touch driving signal is supplied to the plurality of touch electrodes via the plurality of touch lines.

8. The touch display device according to claim 7, wherein the display panel senses a touch which occurs in a plurality of touch electrodes, recognizes a touch position in a touch electrode sensing period, and specifies the fingerprint sensing area based on the recognized touch position.

9. The touch display device according to claim 8, wherein the display panel supplies a voltage or a signal which is predetermined for the fingerprint sensing area to the data lines or the gate lines after having specified the fingerprint sensing area.

10. The touch display device according to claim 7, wherein the touch driver is configured to include a plurality of touch line multiplexers, a plurality of data line multiplexers, and a plurality of touch sensors, and
wherein a first down-terminal of at least one data line multiplexer out of the plurality of data line multiplexers is configured to be electrically connected to a data terminal of at least one touch line multiplexer out of the plurality of touch line multiplexers, and the fingerprint driving signal is supplied to the data lines corresponding to the fingerprint sensing area.

11. The touch display device according to claim 7, wherein the touch driver is configured to include a plurality of touch line multiplexers, a plurality of data line multiplexers, and a plurality of touch sensors, and
wherein a noise reduction signal is supplied to a third down-terminal of at least one data line multiplexer out of the plurality of data line multiplexers.

12. The touch display device according to claim 7, wherein the touch driver is configured to include a plurality of touch line multiplexers, a plurality of data line multiplexers, a plurality of line selection multiplexers, and a plurality of touch sensors, and
wherein a first down-terminal of at least one data line multiplexer out of the plurality of data line multiplexers is configured to be electrically connected to at least one line selection multiplexer out of the plurality of line selection multiplexers, and the fingerprint driving signal is supplied to the data lines corresponding to the fingerprint sensing area.

13. A method of driving a touch display device including a plurality of data lines, a plurality of gate lines, a plurality of pixel electrodes which are arranged in areas adjacent to points at which the data lines and the gate lines cross each other, a plurality of touch electrodes, and a plurality of touch lines, the method comprising:
sensing a finger touch which occurs in the touch display device;
recognizing a position at which the finger touch has occurred;
specifying a fingerprint sensing area based on the position at which the finger touch has occurred;
preparing for sensing of a fingerprint in the fingerprint sensing area; and
sensing at least a part of the fingerprint sensing area and recognizing a fingerprint of the sensed part,
wherein the sensing the at least the part of the fingerprint sensing area includes supplying a second gate driving voltage to the gate lines corresponding to the fingerprint sensing area, and
wherein the second gate driving voltage which is supplied to the gate lines corresponding to the fingerprint sensing area in the sensing the at least the part of the fingerprint sensing area is higher than a first gate driving voltage which is supplied to the gate lines corresponding to the display image update area in a display period of the display panel, or a time in which the second gate driving voltage is supplied to the gate lines corresponding to the fingerprint sensing area in the sensing the at least the part of the fingerprint sensing area is longer than a time in which a first gate driving voltage is supplied to the gate lines corresponding to the display image update area in the display period of the display panel.

14. The method of driving the touch display device according to claim 13, wherein the specifying the fingerprint sensing area includes:
specifying the fingerprint sensing area based on a density of the touch electrodes in which a sensed touch raw value is equal to or greater than a predetermined reference value out of the plurality of touch electrodes.

15. The method of driving the touch display device according to claim 13, wherein the specifying the fingerprint sensing area includes:
specifying the fingerprint sensing area based on the number of touch electrodes or a degree of closeness or a degree of separation of the touch electrodes associated with the position at which the touch has occurred.

16. The method of driving the touch display device according to claim 13, wherein the preparing for the sensing of the fingerprint includes:
displaying a predetermined pattern or a predetermined image in the specified fingerprint sensing area or supplying a predetermined voltage or signal to the data lines corresponding to the specified fingerprint sensing area, the gate lines corresponding to the specified fingerprint sensing area, or the touch electrodes corresponding to the specific fingerprint sensing area.

17. A touch driver that drives a touch display device including a plurality of data lines, a plurality of gate lines, a plurality of pixel electrodes which are arranged in areas adjacent to points at which the data lines and the gate lines cross each other, and a plurality of touch lines, the touch driver comprising:
- a plurality of touch line multiplexers configured to transmit a touch driving signal to the plurality of touch lines via a plurality of touch line channel portions;
- a plurality of data line multiplexers configured to transmit a data voltage to the corresponding data lines out of the plurality of data lines via the data line channel portions; and
- a plurality of touch sensors configured to be electrically connected to the corresponding data line multiplexers out of the plurality of data line multiplexers,
- wherein a first down-terminal of at least one data line multiplexer out of the plurality of data line multiplexers is configured to be electrically connected to a data terminal of at least one touch line multiplexer out of the plurality of touch line multiplexers, and a fingerprint driving signal is supplied to the data lines corresponding to a fingerprint sensing area of the touch display device.

18. The touch driver according to claim 17, further comprising a plurality of touch line multiplexers,
- wherein a first down-terminal of at least one data line multiplexer out of the plurality of data line multiplexers is configured to be electrically connected to at least one line selection multiplexer out of the plurality of line selection multiplexers, and the fingerprint driving signal is supplied to the data lines corresponding to the fingerprint sensing area of the touch display device.

19. The touch display device according to claim 1, wherein only some of the plurality of data lines and only some of the plurality of pixel electrodes are used to sense a fingerprint of a user, without requiring a separate fingerprint sensor device to be present in an active area of the display panel.

20. The touch display device according to claim 19, wherein the fingerprint driving signal is supplied to the some of the plurality of data lines, and the fingerprint is sensed according to a change in capacitance of each of the some of the plurality of pixel electrodes corresponding to the some of the plurality of data lines.

* * * * *